US012546165B2

(12) United States Patent
Clark et al.

(10) Patent No.: US 12,546,165 B2
(45) Date of Patent: Feb. 10, 2026

(54) WALKTHROUGH AND STANDOFF MECHANISMS FOR LADDERS, LADDERS INCORPORATING SAME AND RELATED METHODS

(71) Applicant: LITTLE GIANT LADDER SYSTEMS, LLC, Springville, UT (US)

(72) Inventors: Wesley V. Clark, Springville, UT (US); N. Ryan Moss, Mapleton, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 0 days.

(21) Appl. No.: 18/486,940

(22) Filed: Oct. 13, 2023

(65) Prior Publication Data

US 2024/0044205 A1 Feb. 8, 2024

Related U.S. Application Data

(63) Continuation of application No. 17/961,834, filed on Oct. 7, 2022, now Pat. No. 11,788,352, and a (Continued)

(51) Int. Cl.
*E06C 1/32* (2006.01)
*E06C 1/12* (2006.01)
(Continued)

(52) U.S. Cl.
CPC .................. *E06C 1/32* (2013.01); *E06C 1/12* (2013.01); *E06C 1/18* (2013.01); *E06C 7/06* (2013.01);
(Continued)

(58) Field of Classification Search
CPC . E06C 7/423; E06C 7/06; E06C 7/182; E06C 7/48; E06C 7/50; E06C 1/32; E06C 1/12; E06C 1/18; E06C 1/397
See application file for complete search history.

(56) References Cited

U.S. PATENT DOCUMENTS 239,727 A * 4/1881 Cauble ...................... E06C 1/12
182/212
2,881,028 A 4/1959 Baird
(Continued)

FOREIGN PATENT DOCUMENTS

CA 2473665 A1 2/2006
CN 202970428 U 6/2013
(Continued)

OTHER PUBLICATIONS

EP Application No. 18877133.1, European Search Report, dated Oct. 12, 2021.
(Continued)

*Primary Examiner* — Justin B Rephann
(74) *Attorney, Agent, or Firm* — Dorsey & Whitney, LLP

(57) ABSTRACT

A ladder and ladder accessory are provided including an accessory that may be coupled to the ladder in multiple configurations and serve multiple purposes. In one embodiment, a pair of components are each selectively coupled with associated rails of a ladder in a first, stored state, and a second, walkthrough state. When in the walkthrough state, the components extend upwards from and above the rails so that a user may gasp the components and step between the components when transitioning from the ladder to an elevated surface (e.g., a roof) or vice versa. In another embodiment, the components may be coupled to the ladder such that they extend in a direction that is substantially transverse to a plane through which the rails extend. When in this transverse orientation, the components may be used as a stand-off device.

17 Claims, 20 Drawing Sheets

Related U.S. Application Data continuation of application No. 16/185,379, filed on Nov. 9, 2018, now Pat. No. 11,466,516.

(60) Provisional application No. 62/584,279, filed on Nov. 10, 2017.

(51) Int. Cl.

| | |
|---|---|
| ***E06C 1/18*** | (2006.01) |
| ***E06C 7/06*** | (2006.01) |
| ***E06C 7/08*** | (2006.01) |
| ***E06C 7/18*** | (2006.01) |
| ***E06C 7/46*** | (2006.01) |
| ***E06C 7/48*** | (2006.01) |
| *E06C 1/397* | (2006.01) |
| *E06C 7/00* | (2006.01) |
| *E06C 7/50* | (2006.01) |

(52) U.S. Cl.

CPC .............. *E06C 7/081* (2013.01); *E06C 7/182* (2013.01); *E06C 7/46* (2013.01); *E06C 7/48* (2013.01); *E06C 1/397* (2013.01); *E06C 7/006* (2013.01); *E06C 7/50* (2013.01)

(56) References Cited

U.S. PATENT DOCUMENTS

| | | | | |
|---|---|---|---|---|
| 4,147,231 | A * | 4/1979 | Chantler | E06C 7/423 182/172 |
| 4,210,224 | A | 7/1980 | Kummerlin et al. | |
| 4,407,045 | A | 10/1983 | Boothe | |
| 4,519,477 | A * | 5/1985 | Ralston | E06C 7/423 182/172 |
| 4,566,150 | A | 1/1986 | Boothe | |
| 4,632,220 | A * | 12/1986 | Murrell | E06C 7/44 182/172 |
| 4,723,629 | A * | 2/1988 | Vanden Hoek | E06C 7/423 182/172 |
| 4,798,262 | A * | 1/1989 | Margolies | E06C 1/20 182/172 |
| 5,086,876 | A * | 2/1992 | Severson | E06C 7/42 182/172 |
| 5,222,575 | A | 6/1993 | Santos | |
| 5,582,269 | A | 12/1996 | Gugel et al. | |
| 5,590,739 | A * | 1/1997 | High | E06C 1/397 182/208 |
| 5,941,343 | A | 8/1999 | Kelsey | |
| 6,012,546 | A | 1/2000 | Bee et al. | |
| 6,394,229 | B1 | 5/2002 | Hastreiter | |
| 6,607,053 | B1 * | 8/2003 | Warren | E06C 9/02 182/106 |
| 7,364,017 | B2 | 4/2008 | Moss et al. | |
| 8,186,481 | B2 * | 5/2012 | Moss | E06C 7/16 182/25 |
| 8,235,175 | B1 | 8/2012 | Feldhaus | |
| 8,602,163 | B2 | 12/2013 | Davis | |
| 8,839,907 | B2 | 9/2014 | Davis | |
| 8,839,908 | B2 | 9/2014 | Davis | |
| 9,016,434 | B2 | 4/2015 | Moss et al. | |
| 9,314,100 | B1 | 4/2016 | Logan | |
| D756,465 | S | 5/2016 | Emily | |
| 9,797,194 | B2 * | 10/2017 | Moss | E06C 7/423 |
| 10,487,576 | B2 | 11/2019 | Ballard et al. | |
| 10,487,578 | B2 | 11/2019 | Smith et al. | |
| 10,584,532 | B2 * | 3/2020 | Moss | E06C 7/02 |
| 10,844,660 | B2 | 11/2020 | Leng | |
| 10,883,310 | B2 | 1/2021 | Johnson et al. | |
| 2002/0074187 | A1 * | 6/2002 | Bendle | E06C 1/22 182/172 |
| 2002/0084143 | A1 * | 7/2002 | Roy | E06C 7/44 182/204 |
| 2002/0134619 | A1 * | 9/2002 | Schwenke | E06C 1/34 182/107 |
| 2004/0129497 | A1 * | 7/2004 | Weiss | E06C 1/39 182/163 |
| 2008/0190692 | A1 | 8/2008 | Feik | |
| 2008/0202850 | A1 | 8/2008 | Anderson et al. | |
| 2008/0314682 | A1 * | 12/2008 | Cogswell | E06C 7/46 182/108 |
| 2010/0038172 | A1 * | 2/2010 | Ralston | E06C 7/18 182/107 |
| 2010/0213007 | A1 | 8/2010 | Richards | |
| 2010/0230208 | A1 | 9/2010 | Hsiao et al. | |
| 2010/0300805 | A1 * | 12/2010 | Moss | E06C 1/12 182/172 |
| 2010/0326770 | A1 * | 12/2010 | Clifford | E06C 7/423 182/214 |
| 2011/0017549 | A1 * | 1/2011 | Lietz | E06C 7/10 182/172 |
| 2011/0067954 | A1 | 3/2011 | Deal | |
| 2011/0127110 | A1 * | 6/2011 | Trang | E06C 7/46 182/129 |
| 2011/0247895 | A1 | 10/2011 | Smith | |
| 2013/0270037 | A1 | 10/2013 | Pensieri | |
| 2014/0202793 | A1 * | 7/2014 | Jonas | E06C 7/423 182/108 |
| 2015/0068842 | A1 * | 3/2015 | Moss | E06C 7/423 292/341.15 |
| 2015/0090531 | A1 * | 4/2015 | Yang | E06C 7/46 182/104 |
| 2016/0215563 | A1 | 7/2016 | Ellis | |
| 2017/0254145 | A1 | 9/2017 | Ballard et al. | |
| 2017/0335626 | A1 * | 11/2017 | Saxby | E06C 7/423 |
| 2017/0356244 | A1 | 12/2017 | Peterson et al. | |
| 2018/0094488 | A1 * | 4/2018 | Major | E06C 7/44 |
| 2018/0187486 | A1 * | 7/2018 | Ford | E06C 7/486 |
| 2018/0215304 | A1 | 8/2018 | Jevaney et al. | |
| 2018/0258697 | A1 | 9/2018 | Torin | |
| 2018/0327002 | A1 | 11/2018 | Nasrabad et al. | |
| 2018/0340371 | A1 * | 11/2018 | Georges | E06C 7/423 |
| 2019/0145170 | A1 * | 5/2019 | Clark | E06C 7/06 182/104 |
| 2020/0149348 | A1 * | 5/2020 | Khwaja | E06C 1/12 |
| 2020/0248507 | A1 * | 8/2020 | Moss | E06C 7/182 |
| 2021/0010327 | A1 | 1/2021 | Boyer et al. | |
| 2021/0062580 | A1 | 3/2021 | Smith | |
| 2021/0198946 | A1 | 7/2021 | Nitz | |

FOREIGN PATENT DOCUMENTS

| | | |
|---|---|---|
| CN | 105735882 A | 7/2016 |
| CN | 109113565 A * | 1/2019 |
| KR | 200146389 Y1 | 6/1999 |

OTHER PUBLICATIONS

International Preliminary Report on Patentability for PCT Application No. PCT/US2018/059964, mailed May 22, 2020.

International Search Report and Written Opinion for PCT Application No. PCT/US2018/059964, mailed Feb. 26, 2019.

* cited by examiner

WALKTHROUGH AND STANDOFF MECHANISMS FOR LADDERS, LADDERS INCORPORATING SAME AND RELATED METHODS

CROSS-REFERENCE TO RELATED APPLICATIONS

This application is a continuation of U.S. patent application Ser. No. 17/961,834, filed on 7 Oct. 2022, which is a continuation of U.S. patent application Ser. No. 16/185,379, filed on 9 Nov. 2018 and issued on 11 Oct. 2022 as U.S. Pat. No. 11,466,516, which claims the benefit of U.S. Provisional Patent Application No. 62/584,279 filed on 10 Nov. 2017, entitled WALKTHROUGH AND STANDOFF MECHANISMS FOR LADDERS, LADDERS INCORPORATING SAME AND RELATED METHODS, and the disclosures of which are hereby incorporated by reference in their entireties.

BACKGROUND

Ladders are conventionally employed to provide a user thereof with improved access to locations that might otherwise be inaccessible. Ladders come in many shapes and sizes, such as straight ladders, straight extension ladders, stepladders, and combination step and extension ladders (referred to herein as combination ladders). Combination ladders incorporate, in a single ladder, many of the benefits of other ladder designs as they can be used as an adjustable stepladder or as an extension ladder.

Ladders are common tools for professional tradesman and homeowners alike. Sometimes the use of a ladder can be an awkward experience, even for those who use ladders on a regular basis, when certain tasks are to be performed while standing on the rungs of a ladder. For example, it can be easy to lose one's balance on a ladder while working on an overhead project (e.g., painting a ceiling, changing a light bulb, etc.).

Sometimes, a ladder may be, or at least feel, unstable when leaning against, and supported by, an edge of a roof (e.g., the rain gutter positioned against the edge of the roof), particularly if a user reaches out beyond the side rails of the ladder while working, changing the load dynamics experienced by the ladder. Thus, when leaning a ladder against a support surface (a wall, the edge of a roof, etc.), sometimes it is desirable to provide additional stability.

Another difficulty when using ladders includes exiting an upper portion of the ladder onto another surface. For example, when a combination ladder, a straight ladder or an extension ladder is used to access a roof, the transition from the ladder to the roof (and vice versa) introduces potential for slipping, tripping and substantial injury. Thus, it is sometimes desirable to provide so-called walkthrough devices to offer a structure that a user can grab or otherwise interact with in providing stability during such transitions.

While various accessories or "add-on" features may help to provide an improved stability and safety, if a ladder becomes laden with too many accessories, it becomes overly heavy, awkward to maneuver, and difficult to store and transport. Thus, in some instances, users would prefer to do without accessories or features that might otherwise provide increased stability or safety during use of a ladder.

It is a continual desire within the industry to improve various aspects of ladders including their safety, functionality, ergonomics and efficiency of use.

SUMMARY OF THE DISCLOSURE

The present disclosure provides embodiments of ladders and accessories for ladders. The ladders and accessories may be deployed in any of several selected configurations including, for example, a walkthrough configuration, a standoff configuration, or a stored configuration.

In one embodiment, a ladder is provided that comprises a first assembly (i.e., a first rail assembly) comprising including a first pair of rails and a first plurality of rungs coupled to the first pair of rails, a second assembly (i.e., a second rail assembly) including a second pair of rails and a second plurality of rungs coupled to the second pair of rails, a pair of hinges rotatably coupling the first assembly with the second assembly, at least one bracket positioned on a laterally outer side surface of a first rail of the first pair of rails, at least another bracket positioned on a laterally outer side surface of a second rail of the first pair of rails. a first component releasably coupled with the at least one bracket in at least two different positions including a storage position and a walkthrough position and a second component releasably coupled with the at least another bracket in at least two different positions including a storage position and a walkthrough position.

In one embodiment, the ladder further comprises at least one transverse bracket coupled to at least one of the first rail and the second rail.

In one embodiment, the first component is configured for releasable coupling with the at least one transverse bracket and the second component is configured for releasable coupling with the at least one transverse bracket.

In one embodiment, the ladder further comprises a coupling component extending between the first component and the second component when the first component is coupled with the at least one transverse bracket and when the second component is coupled with the at least one transverse bracket.

In one embodiment, the coupling component is a v-shaped component.

In one embodiment, the first component is coupled with the at least one transverse bracket, the first component extends substantially transverse to a plane in which the first rail and the second rail extend.

In one embodiment, the first component and the second component each include an end cap having an engagement surface.

In one embodiment, the first component and the second component each include a first arm and a second arm telescopingly coupled with the first arm.

In one embodiment, the first component and the second component each include an engagement member pivotally coupled with the second arm, the engagement member being selectively locked in two different positions relative to the second arm.

In one embodiment, the first component and the second component each have a length extending in a common plane with the first rail and the second rail regardless of whether the first component and the second component are in their respective first positions or second positions.

In one embodiment, the ladder further comprises a lock pin coupled with the first component and configured to engage a first opening formed in a least one of the first rail or the at least one bracket when rail is in the first position.

In one embodiment, the ladder further comprises a biasing member configured to bias the lock pin into engagement with the first opening.

In one embodiment, the ladder further comprises a pair of actuator members pivotally coupled with the lock pin.

In one embodiment, the pair of actuator members includes a first member positioned on a first side of an arm of the first component and a second member on an opposing side of the arm of the first component, wherein when the first actuating member and the second actuating member are displaced towards each other, a free end of the lock pin retracts relative to the at least one bracket.

In one embodiment, the first assembly includes a first pair of inner rails slidably coupled with the first pair of rails and wherein the second assembly includes a second pair of inner rails slidably coupled with the second pair of rails.

In one embodiment, the ladder further comprises a third plurality of rungs coupled between the first pair of inner rails and a fourth plurality of rungs coupled between the second pair of inner rails.

In accordance with another embodiment of the present disclosure, an accessory for a ladder is provided. The accessory comprises at least one arm, at least one bracket coupled with the at least one arm and a locking mechanism associated with the at least one bracket. The locking mechanism includes a first actuating member positioned on a first side of the at least one arm, a second actuating member positioned on a second opposing side of the at least one arm, a lock pin pivotally coupled with the first and second actuating members, the lock pin extending through a first portion and a second portion of the at least one arm, a biasing member positioned about a portion of the lock pin and biasing the lock pin in a first direction, wherein, when the first and second actuating members are displaced towards each other, the lock pin is displaced in a second direction, opposite the first direction.

In one embodiment, the at least one arm includes a first arm and a second arm telescopingly coupled with the first arm.

In one embodiment, the ladder further comprises an engagement member pivotally coupled with the at least one arm.

In one embodiment, the ladder further comprises a second locking mechanism configured to selectively lock the engagement member in a first position and at least a second position relative to the at least one arm.

In one embodiment, when in the first position, the engagement member extends longitudinally outward from the at least one arm and, when in the at least a second position, the engagement member extends at an angle of substantially 90 degrees relative to a length of the at least one arm.

Features, components and aspects of one embodiment may be combined with features, components and aspects of any other embodiment without limitation.

BRIEF DESCRIPTION OF THE DRAWINGS

The foregoing and other advantages of the invention will become apparent upon reading the following detailed description and upon reference to the drawings in which.

DESCRIPTION OF THE EMBODIMENTS

Figure 1:
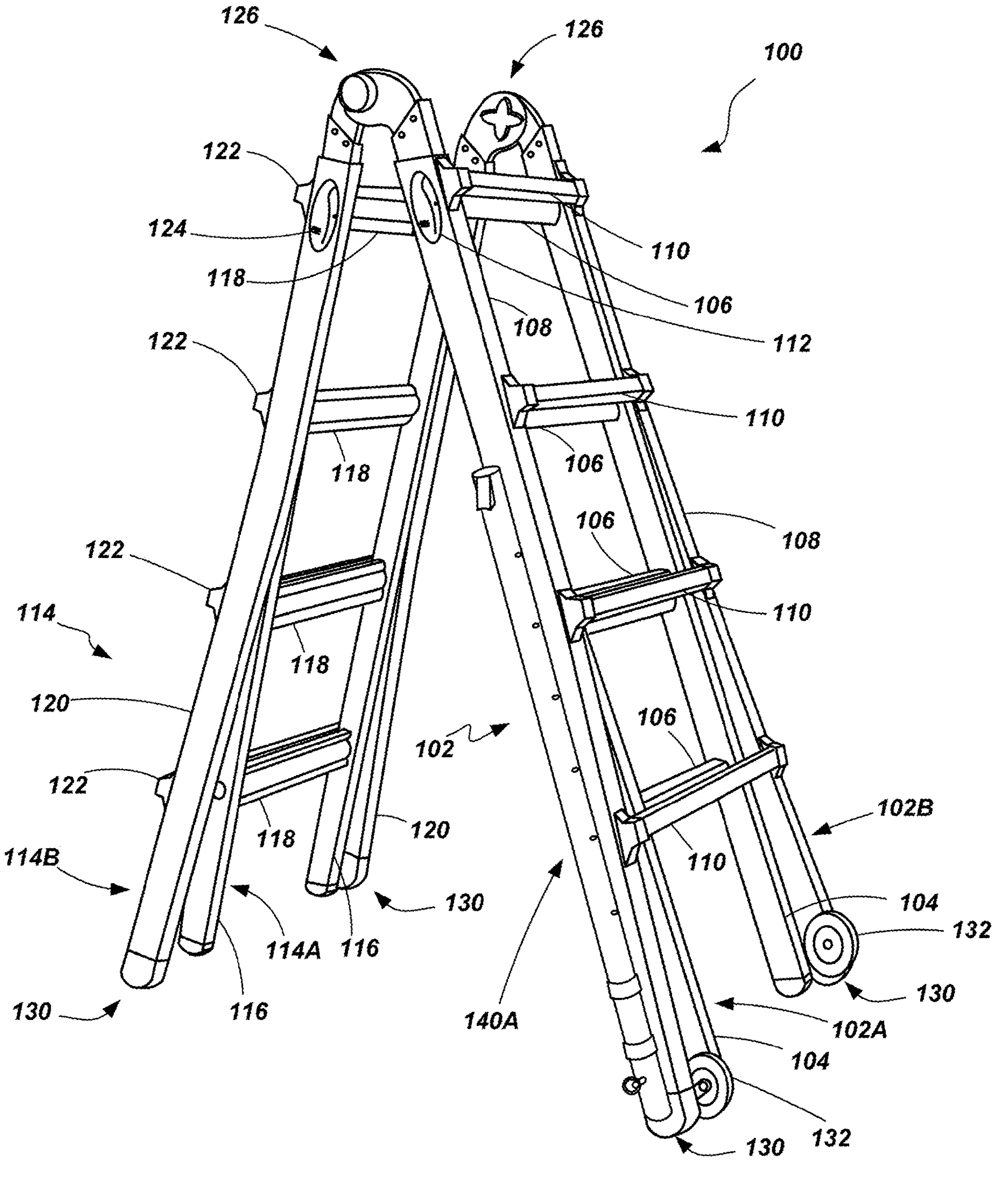
FIG. 1 is a perspective view of a ladder and associated components in accordance with an embodiment of the present disclosure while in a step ladder configuration.
Figure 2:
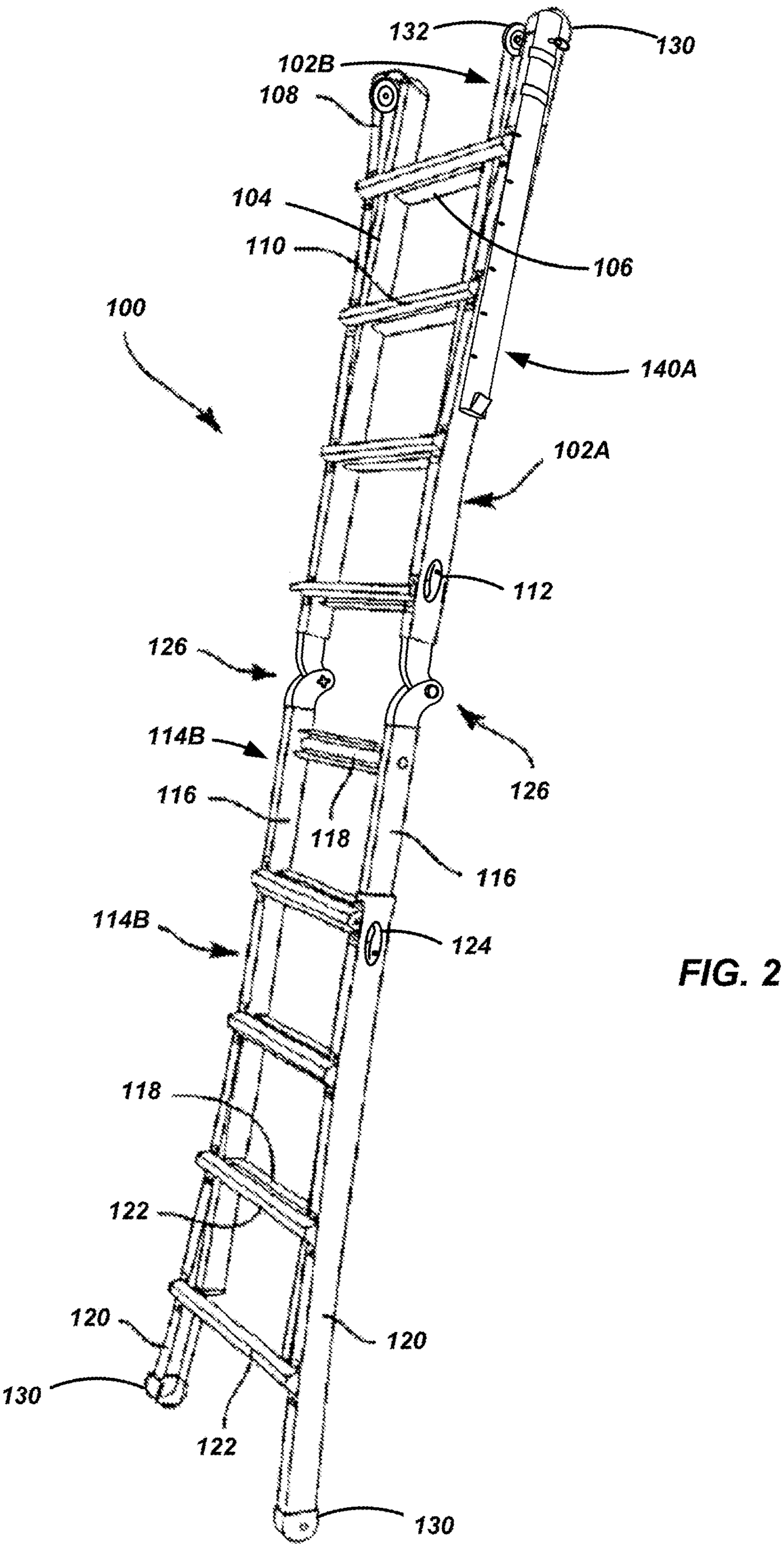
FIG. 2 is a perspective view of the ladder shown in FIG. 1, in an extension ladder configuration.

Referring to FIGS. 1 and 2, a combination ladder 100 is shown. FIG. 1 illustrates the ladder 100 while in a stepladder configuration while FIG. 2 illustrates the ladder 100 in an extension ladder configuration. The combination ladder 100 includes a first rail assembly 102 including an inner assembly 102A slidably coupled with an outer assembly 102B. The inner assembly 102A includes a pair of spaced apart rails 104 coupled with a plurality of rungs 106. Likewise, the outer assembly 102B includes a pair of spaced apart rails 108 coupled to a plurality of rungs 110. The rails 104 of the inner assembly 102A are slidably coupled with the rails 108 of the outer assembly 102B. The inner and outer assemblies 102A and 102B may be selectively locked relative to each other such that one or more of their respective rungs 106 and 110 are aligned with each other. A locking mechanism 112 may be configured to engage a portion of the inner rail assembly 102A and the outer rail assembly 102B so as to selectively lock the two assemblies relative to each other. While only a single locking mechanism 112 is shown due to the views of the ladder represented in FIGS. 1 and 2, a second, similar locking mechanism is coupled to the other side of the rail assembly 102 as will be noted in subsequent drawing figures.

The combination ladder 100 also includes a second rail assembly 114 that includes an inner assembly 114A slidably coupled with an outer assembly 114B. The inner assembly 114A includes a pair of rails 116 coupled with a plurality of rungs 118 and is configured similar to the inner assembly 102A of the first rail assembly 102A described hereinabove. Likewise, the outer assembly 114B includes a pair of rails 120 coupled with a plurality of rungs 122 and is configured similar to the outer assembly 102B of the first rail assembly 102 described hereinabove. Locking mechanisms 124 may be associated with inner and outer assemblies 114A and 114B to enable selective positioning of the inner assembly 114A relative to the outer assembly 114B as described with respect to the first rail assembly 102 hereinabove.

Some examples of locking mechanisms that may be used with the first and second rail assemblies 102 and 114 are described in U.S. Pat. No. 8,186,481 (the '481 patent) issued May 29, 2012, and U.S. Patent Application Publication No. 2017/0254145, published Sep. 7, 2017, the disclosures of which are incorporated by reference herein in their entireties. While the locking mechanism described in '481 patent is generally described in conjunction with an embodiment of an adjustable step ladder, such a locking mechanism may by readily used with an embodiment such as the presently described combination ladder as well. It is additionally noted that, in one embodiment, the rail assemblies 102 and 114 may be configured similar to those which are described in U.S. Pat. No. 4,210,224 to Kummerlin, the disclosure of which is incorporated by reference in its entirety, the disclosure of which is incorporated by reference herein in its entirety.

The first rail assembly 102 and the second rail assembly 114 are coupled to each other may way of a pair hinge mechanisms 126. Each hinge mechanism 126 may include a first hinge component coupled with a rail of the first rail assembly's inner assembly 102A and a second hinge component coupled with a rail of the second rail assembly's inner assembly 114A. The hinge components of a hinge pair 126 rotate about a pivot member such that the first rail assembly 102 and the second rail assembly 114 may pivot relative to each other. Additionally, the hinge mechanisms 126 may be configured to lock their respective hinge components (and, thus, the associated rails to which they are coupled) at desired angles relative to each other. One example of a suitable hinge mechanism is described in U.S. Pat. No. 4,407,045 to Boothe, the disclosure of which is incorporated by reference herein in its entirety. Additional examples of hinges and hinge mechanisms are described in U.S. Pat. No. 7,364,017, issued Apr. 29, 2008, U.S. Patent Application Publication No. 2017/0356244, published Dec. 14, 2017, the disclosures of which are incorporated by reference herein in their entireties. Of course other configurations of hinge mechanisms are also contemplated as will be appreciated by those of ordinary skill in the art.

The combination ladder 100 is constructed so as to assume a variety of states or configurations. For example, using the locking mechanisms (112 or 124) to adjust a rail assembly (102 or 114) enables the ladder 100 to adjust in height. More specifically, considering the first rail assembly 102, as the rail assembly 102 is adjusted, with the outer assembly 102B being displaced relative to the inner assembly 102A, the associated locking mechanisms 112 engages the inner and outer assemblies (102A and 102B) when they are at desired relative positions with the rungs (106 and 110) of the inner and outer assemblies (102A and 102B) at a desired vertical spacing relative to each other. At some of the adjustment heights of the rail assembly 102, at least some of their respective rungs (106 and 110) align with each other (such as shown in FIG. 1). The second rail assembly 114 may be adjusted in a similar manner, but independently of the first rail assembly 102.

Considering the embodiment shown in FIG. 1, adjustment of the rail assemblies 102 and 114 enables the ladder 100 to be configured as a step ladder with, for example, four effective rungs at a desired height (as shown in FIG. 1), or to be configured as a step ladder that is substantially taller having five, six, seven or eight effective rungs, depending on the relative positioning of the inner and outer assemblies. However, it is noted that the inner and outer rail assemblies may be configured with more or fewer rungs than four. It is also noted that the first rail assembly 102 and the second rail assembly 114 do not have to be adjusted to similar heights (i.e., having the same number of effective rungs). Rather, if the ladder is used on an uneven surface (e.g., on stairs), the first rail assembly 102 may be adjusted to one height while the second rail assembly 114 may be adjusted to a different height in order to compensate for the slope of the supporting surface.

Additionally, the hinge mechanisms 126 provide for additional adjustability of the ladder 100. For example, the hinge pairs 126 enable the first and second rail assemblies 102 and 114 to be adjusted to a variety of angles relative to each other. As shown in FIG. 1, the first and second rail assemblies 102 and 114 may be configured at an acute angle relative to each other such that the ladder may be used as a self-supporting ladder, similar to a step ladder. However, the first and second rail assemblies 102 and 114 may be rotated or pivoted about the hinge mechanisms 126 so that they extend from one another in substantially the same plane (i.e., exhibiting an angle of substantially) 180° with the hinge mechanisms 126 locking them in such an orientation as shown in FIG. 2. When configured in this manner, the ladder 100 may be used as an extension ladder. Moreover, each of the first and second assemblies 102 and 114 are still adjustable as to height (i.e., through the relative displacement of their respective inner and outer assemblies) when in this configuration. It is additionally noted that the rungs of the various assemblies (i.e., rungs 106, 110, 118 and 122) are configured to have support surfaces on both the tops and the bottoms thereof so as to enable their use in either a step ladder configuration or an extension ladder configuration.

The ladder 100 may additionally include feet 130 coupled with the lower extents of the outer rails 108 and 120 of the first and second assemblies 102 and 104. Feet or other structures may also be coupled wo the inner rails 104 and 116 of the first and second assemblies 102 and 104. In some embodiments, wheels 132 may be coupled with one of the assemblies (e.g., the outer rails 108 of the first assembly) for purposes of transporting the ladder (e.g., by tipping the ladder 100 such that the wheels 132 engage the ground and rolling the ladder between locations). When the ladder 100 is in a usable configuration, such as a step ladder as shown in FIG. 1 or as an extension ladder as shown in FIG. 2, the wheels 132 do not contact the ground or supporting surface. Some nonlimiting examples of feet 130 and wheels are set forth in U.S. Pat. No. 9,016,434, issued Apr. 28, 2015, the disclosure of which is incorporated by reference herein in its entirety.

Figure 3:
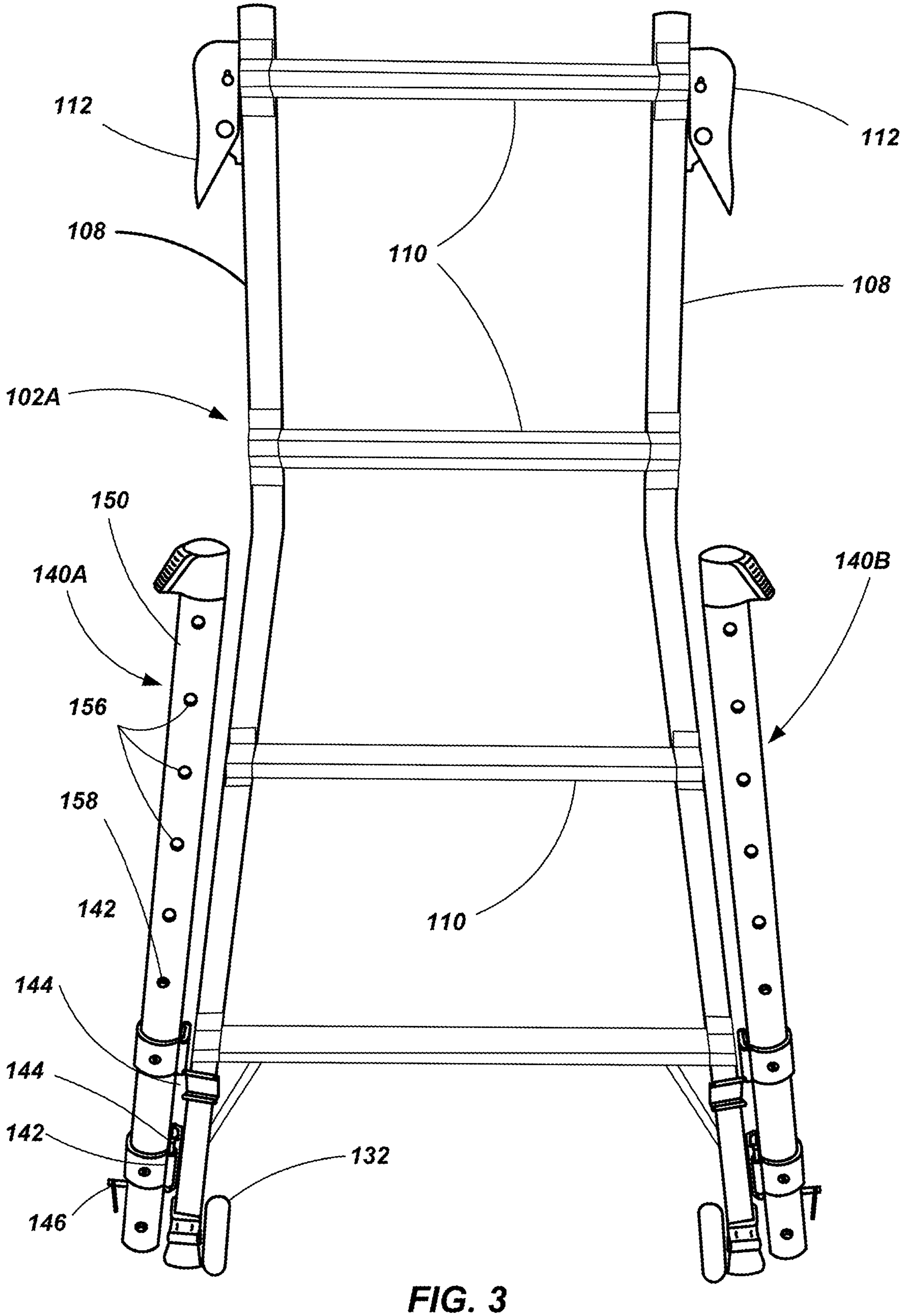
FIG. 3 is a front view of a portion the ladder shown in FIG. 1 with certain components coupled with the ladder in stored state.

As seen in FIGS. 1-3 (FIG. 3 showing a portion of the outer assembly 102), the ladder 100 also includes what will be generally termed herein generally as stabilizer. As will be discussed hereinbelow, the stabilizer may take the form of a walkthrough device, or it may take the form of a standoff device. When not in use, various components 140A and 140B which form the stabilizer may be coupled with rails of one of the assemblies (e.g., rails 108) in a stored state as shown in FIGS. 1 and 2, keeping the components of the stabilizer in a convenient and readily accessible location while avoiding disruption of any normal uses of the ladder 100.

In one embodiment, the components 140A and 140B may be removably coupled to the rails 108 by way of brackets 142 coupled to the rails 108 and mating brackets 144 coupled with the components 140A and 140B. Each component 140A and 140B may further include a locking pin 146 that engages an opening in the associated rail 108 to maintain the component 140A or 140B in a locked position relative to its associated rail 108. For example, with the lock pins 146 engaged as shown in FIG. 3, the components 140A and 140B remain in a stored state. However, when the lock pin 146 is retracted, the components 140A and 140B may slide in a direction generally parallel to the length of the rails 108 until the brackets 142 and 144 release from one another and the components 140A and 140B are uncoupled from the rails 108.

As shown in FIG. 3, the components 140A and 140B may be telescopic such that they are capable of extending in length. Thus, the components 140A and 140B may include, for example, an outer member 150 and an inner member 152 (see, e.g., FIG. 5A) slidably coupled with one another. The outer member 150 may include a plurality of openings 156 configured for alignment with a spring biased button 158 or other detent mechanism. When it is desired to alter a length of a component 140A and 140B, the button 158 may be depressed such that it no longer engages or otherwise interferes with an aligned opening 156, and then the inner member 152 may be slid relative to the outer member 150 to alter the length of the mechanism. The button 158 may then be aligned with, and extend through (by reason of its spring bias), another aligned opening 156, locking the outer and inner members 150 and 152 relative to each other.

Figure 4A:
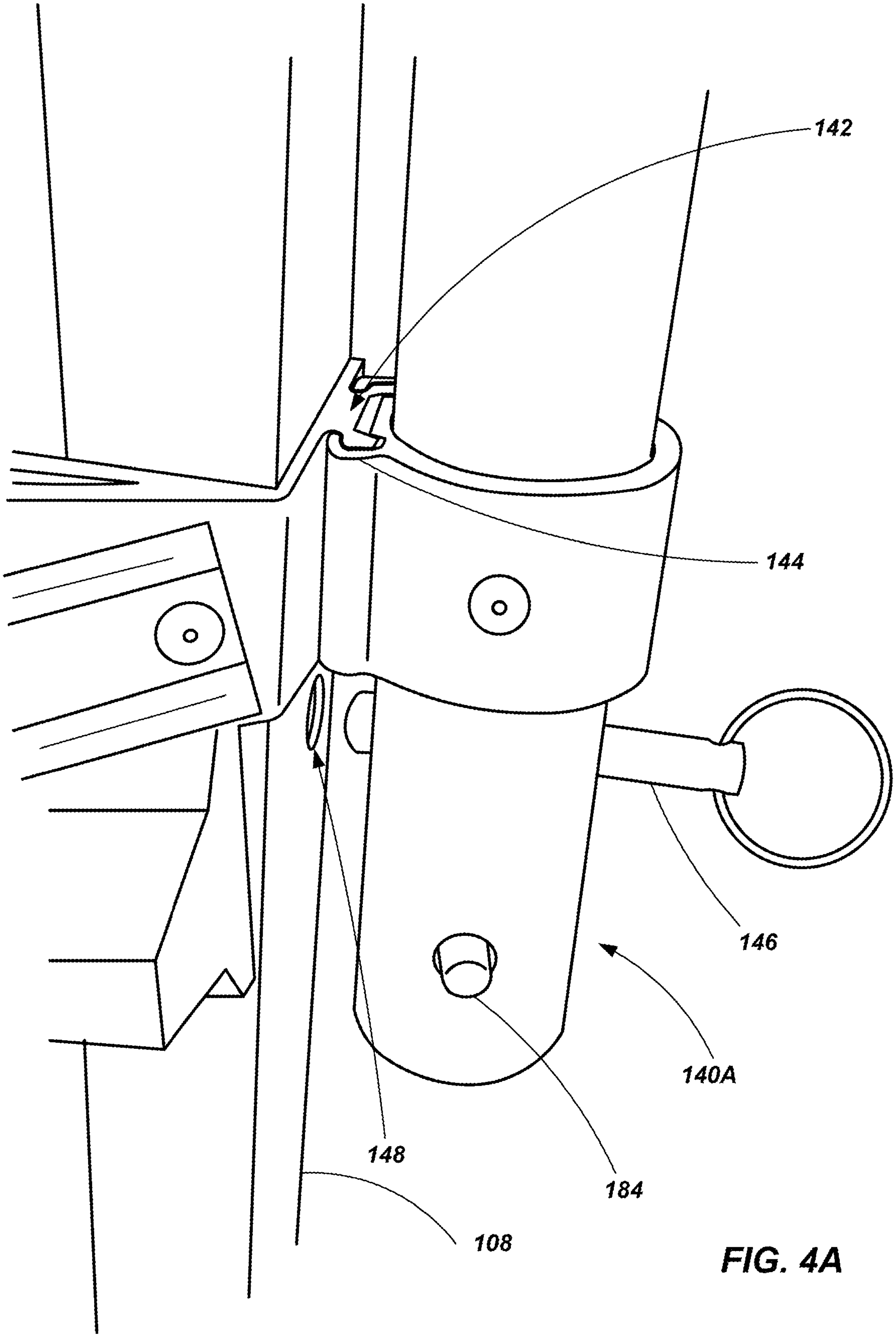
FIGS. 4A-4C show a portion of the ladder shown in FIG. 1 illustrating the coupling and release of one of the components from ladder.
Figure 4B:
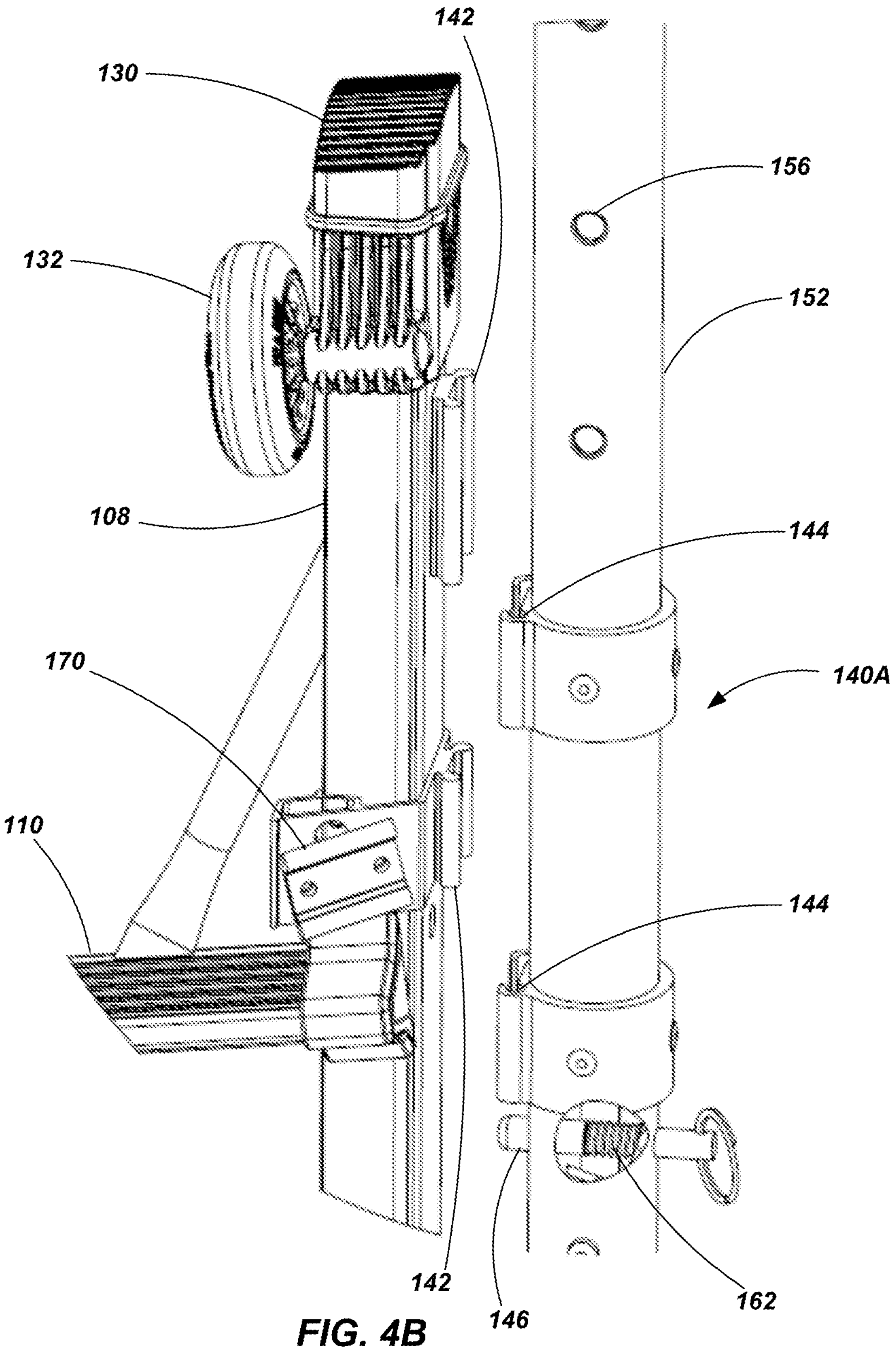
Figure 4C:
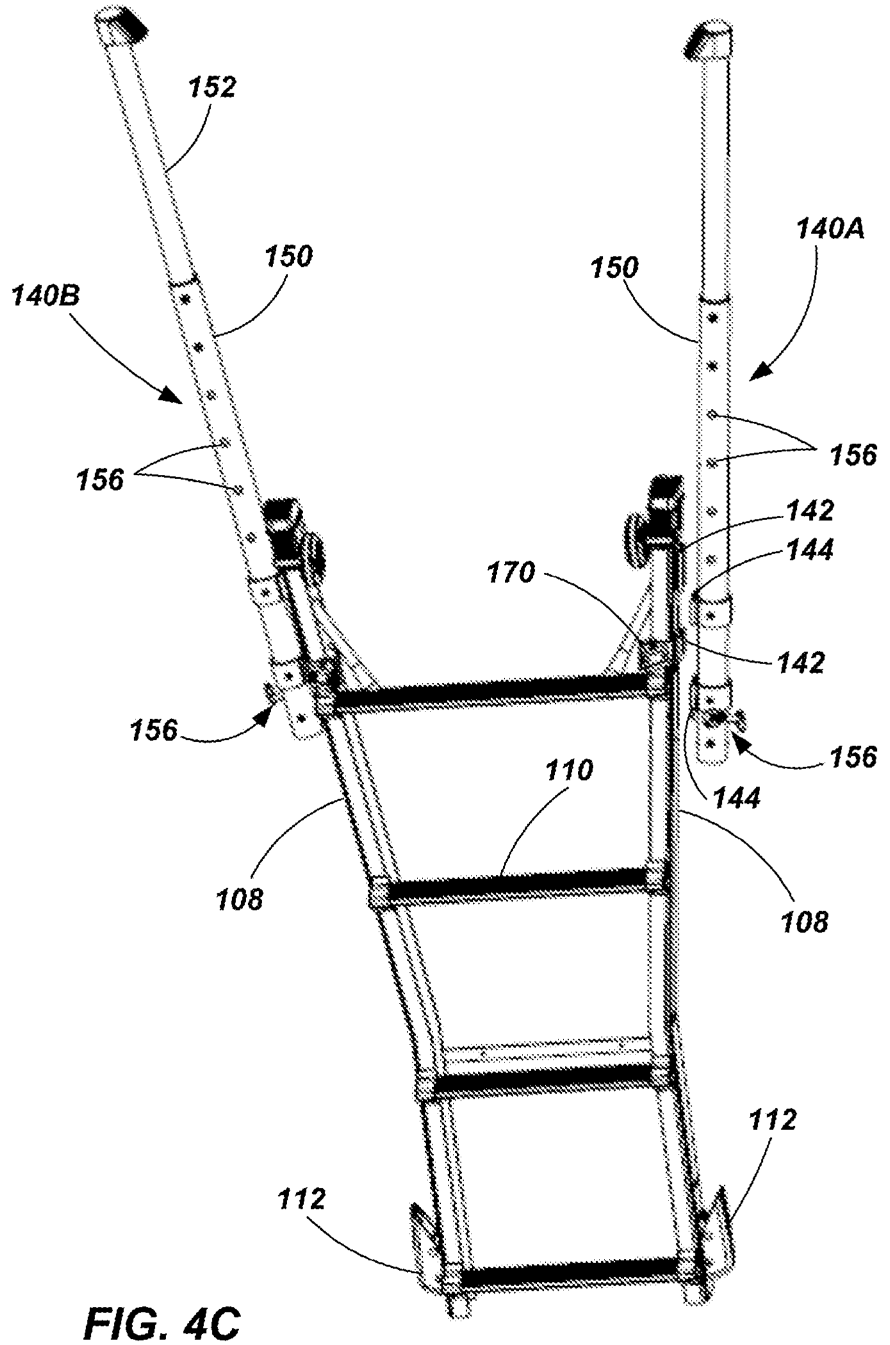

As seen in FIGS. 4A and 4B, the lock pin 146 may extend through a portion of the component 140A and align with an opening 160 in the rail 108. A spring 162 or other biasing member may be associated with the lock pin 146 (e.g., within the component 140A) biasing it towards engagement with any openings of the rail 108. As noted above, with the lock pin 146 retracted, the component 140A may be uncoupled from the ladder rail 108 by sliding it along a length of the rail 108. When it is desired to couple the component with the rail 108, either for storage or for purposes of serving as a walk through stabilizer (e.g., as seen in FIGS. 4C, 5A and 5B), the brackets 142 and 144 may be aligned and the component 140A may be displaced such that the brackets engage one another until the lock pin 146 engages an appropriate opening (e.g., opening 160) and locks the component 140A in place relative to the rails 108.

Figure 5A:
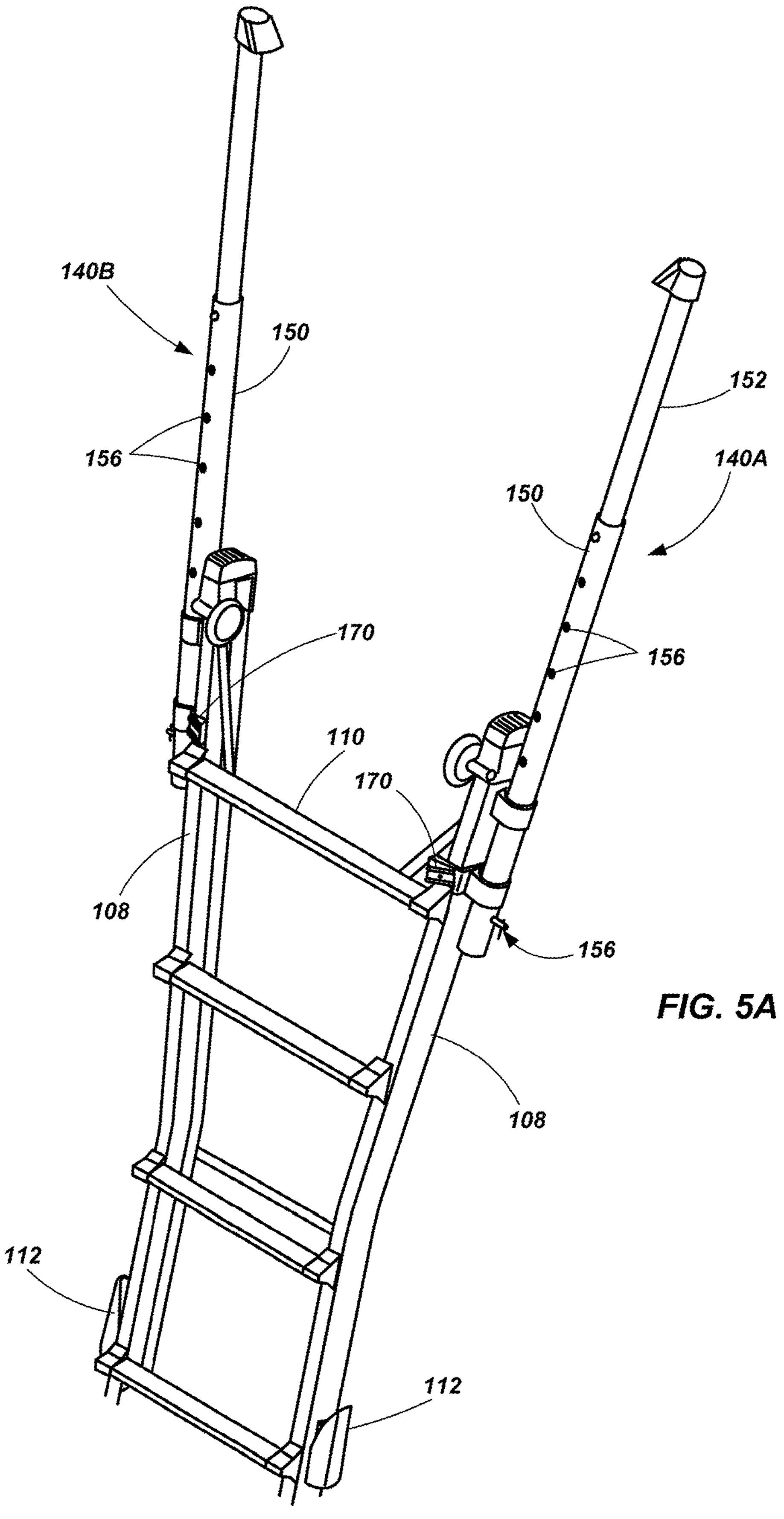
FIGS. 5A and 5B depict views of a portion of the ladder shown in FIG. 1 illustrating the coupling of the components with the ladder in a walkthrough configuration.

FIG. 5A depicts a portion of the ladder 100 with one of the components 140A ready to be attached to its associated rail 108 (or, alternatively, just after removal from the rail 108) and shown the other component 140B attached in a configuration where it may be used as a walkthrough stabilizer. FIG. 5A also shows the components 140A and 140B in an extended state (at least partially), with the inner member 152 extending from the outer member 150 to provide additional length or height to the components 140A and 140B.

Figure 5B:
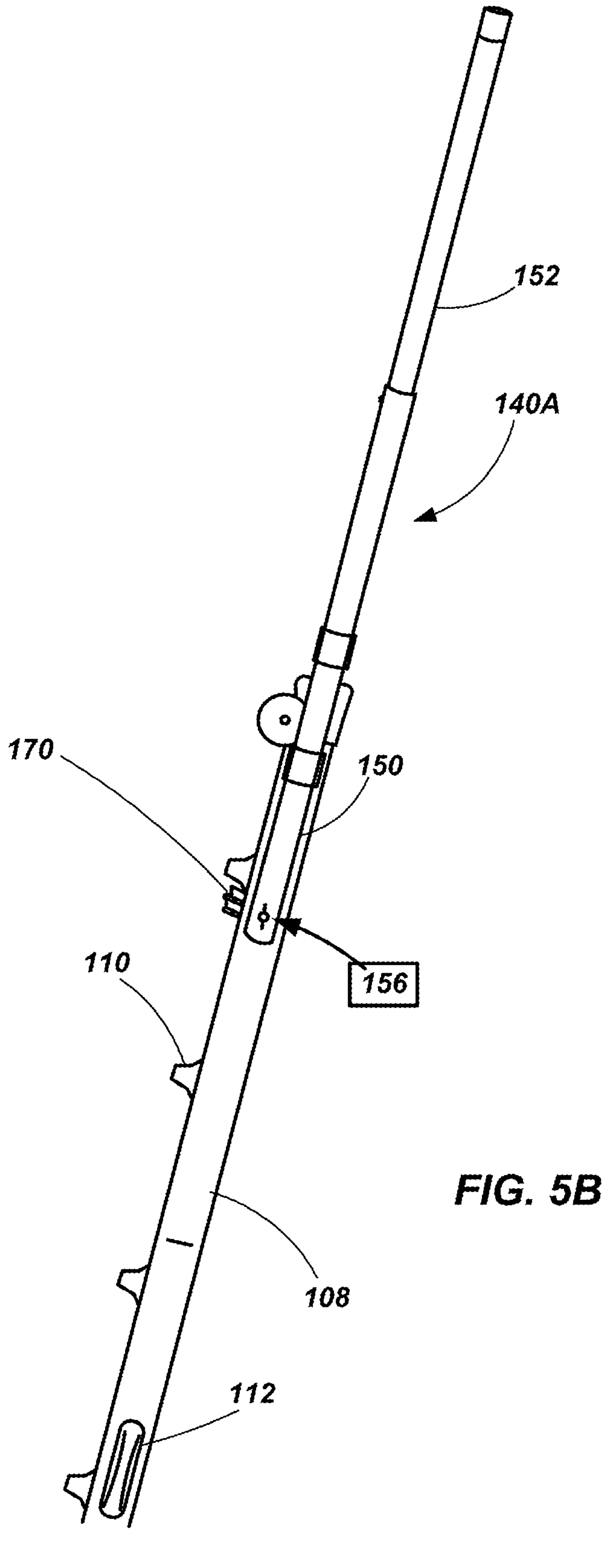

FIGS. 5A and 5B show the components 140A and 140B in a walkthrough configuration with the components 140A and 140B coupled with the rails 108 and extending upward beyond the feet 130 of the rails 108. With the components in this configuration, a user may ascend the ladder 100 and step from the upper most rung 110 onto a roof or other structure, passing between the components 140A and 140B while grasping them for purposes of stability and security. Likewise, a user can grasp the components 140A and 140B and pass between them when transitioning from the roof or other structure back onto the ladder 100. In one embodiment, the components 140A and 140B may extend substantially parallel to their associated rails 108. In another embodiment, the components 140A and 140B may include a bent portion to position them closer to one another and providing a walk through space that is reduced in width. In some embodiments, when in the walkthrough configuration, the components 140A and 140B may extend in a common plane as the rails 108. In some embodiments, additional features or structures may be associated with the components 140A and 140B, including, for example, handles, slip resistant portions for grasping by a user, and the like.

Figure 6A:
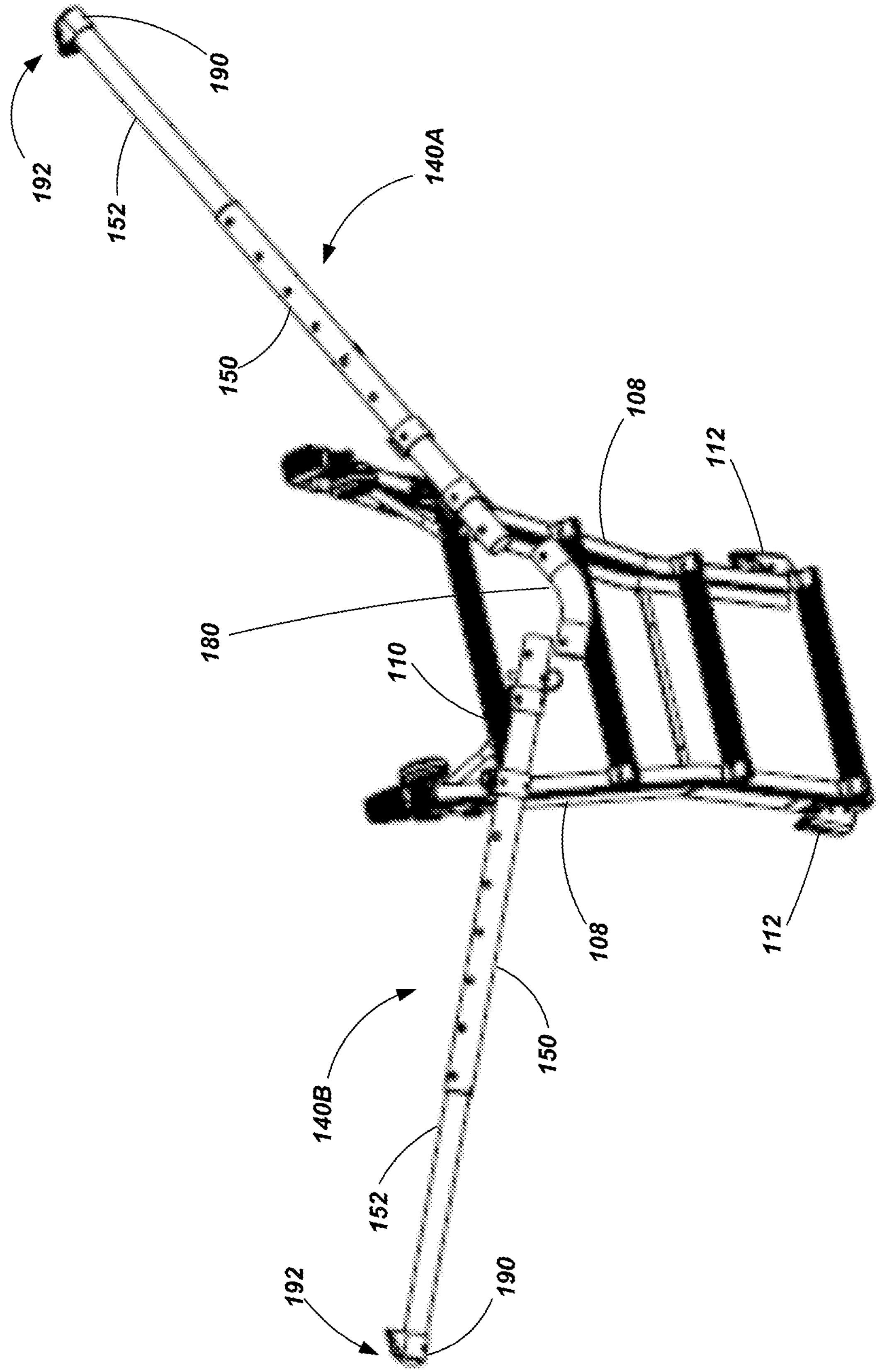
FIGS. 6A-6C depict views of a portion of the ladder shown in FIG. 1 illustrating the coupling of the components with the ladder in a stand-off configuration.
Figure 6B:
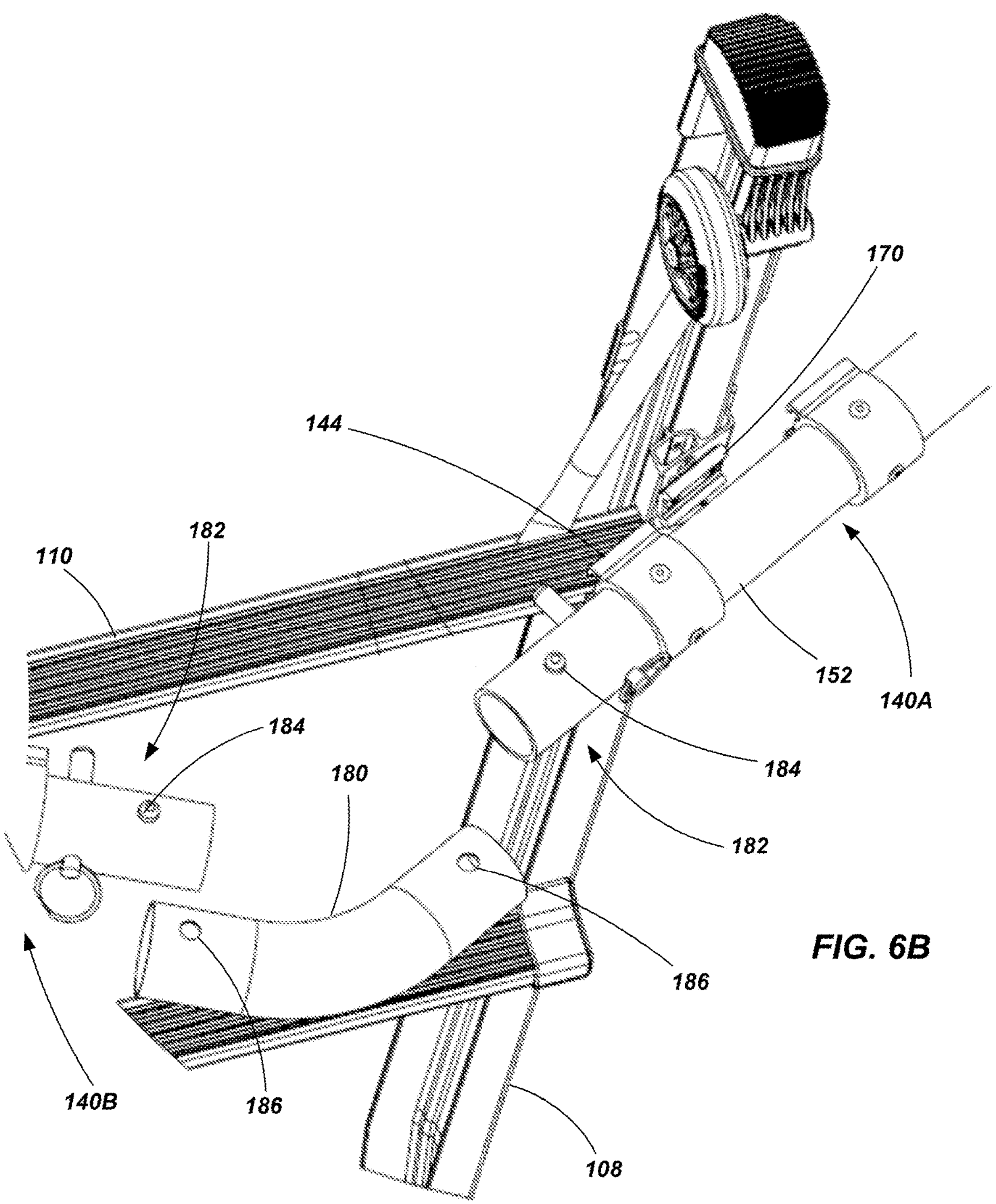

Referring now to FIGS. 6A and 6B, the ladder 100 is shown while coupling the components 140A and 140B with the rails 108 in a stand-off configuration. When connecting in a stand-off configuration, one of the brackets 144 of each of the components 140A and 140B may couple with an associated bracket 170 that is located on a front side or front surface of an associated rail 108. The front brackets 170 (sometimes referred to herein as transverse brackets) may be oriented at an angle such that the components 140A and 140B, when coupled therewith, extend backwards in a plane that may be substantially transverse to the plane in which the rails 108 extend. Additionally, in this configuration, the distal ends 172 of the components 140A and 140B are positioned behind the ladder 100 such that when the ladder is positioned against an upper supporting surface or structure (e.g., a wall, edge of a roof, etc.), the distal ends 172 of the components 140A and 140B contact the supporting structure while the remainder of the ladder 100 (e.g., the rails 108) remain spaced apart from the supporting structure. With the components 140A and 140B in the stand-off configuration, the ladder 100 may be further stabilized with wider points of contact against the upper support structure. Such a configuration may also help to avoid potential damage to portions of the support structure. For example, use of a stand-off stabilizer helps to avoid placing undue force by the ladder rails on a structure such as a rain gutter, a window or other structure.

When assembling the components 140A and 140B in a stand-off configuration, a third, v-shaped component 180 may be used to couple their respective proximal ends 182. For example, the proximal ends 182 may include a spring biased button 184 or other detent mechanism configured to extend through corresponding openings 186 formed in the third component 180 as perhaps best seen in FIG. 6B. When assembled, with the buttons 184 engaged with and extending through the openings 186, and with the other components 140A and 140B angularly coupled with the front side of the rails 108, the stand-off device is locked into place such that the components 140A and 140B do not slide off their respective brackets 170. Again, if desired, the length of the components 140A and 140B may be telescopically adjusted, providing the ability to customize the stand-off width and depth.

The components 140A and 140B may include additional features for use as a stand-off device. For example, caps 190 or other devices may be coupled with the components 140A and 140B at or near their distal ends 172. These caps 190 may include non-marring, non-marking materials so that as they engage with an upper support structure (e.g., the siding or stucco of a wall), they are less likely to leave marks or damage the support structure in any way. Additionally, the caps 190 or other features may include slip resistant portions to help provide traction between the components 140A and 140B and the support structure, helping to keep the ladder more stable during use. In one embodiment, the caps 190 may include engagement surfaces 192 that are oriented at an angle relative to the length or longitudinal axis of the components 140A and 140B, such that they are substantially parallel with an anticipated surface of engagement. Statement another way, the engagement surfaces, or a substantial portion thereof, may extend in a plane that is substantially parallel to the plane in which the rails 108 extend.

Figure 6C:
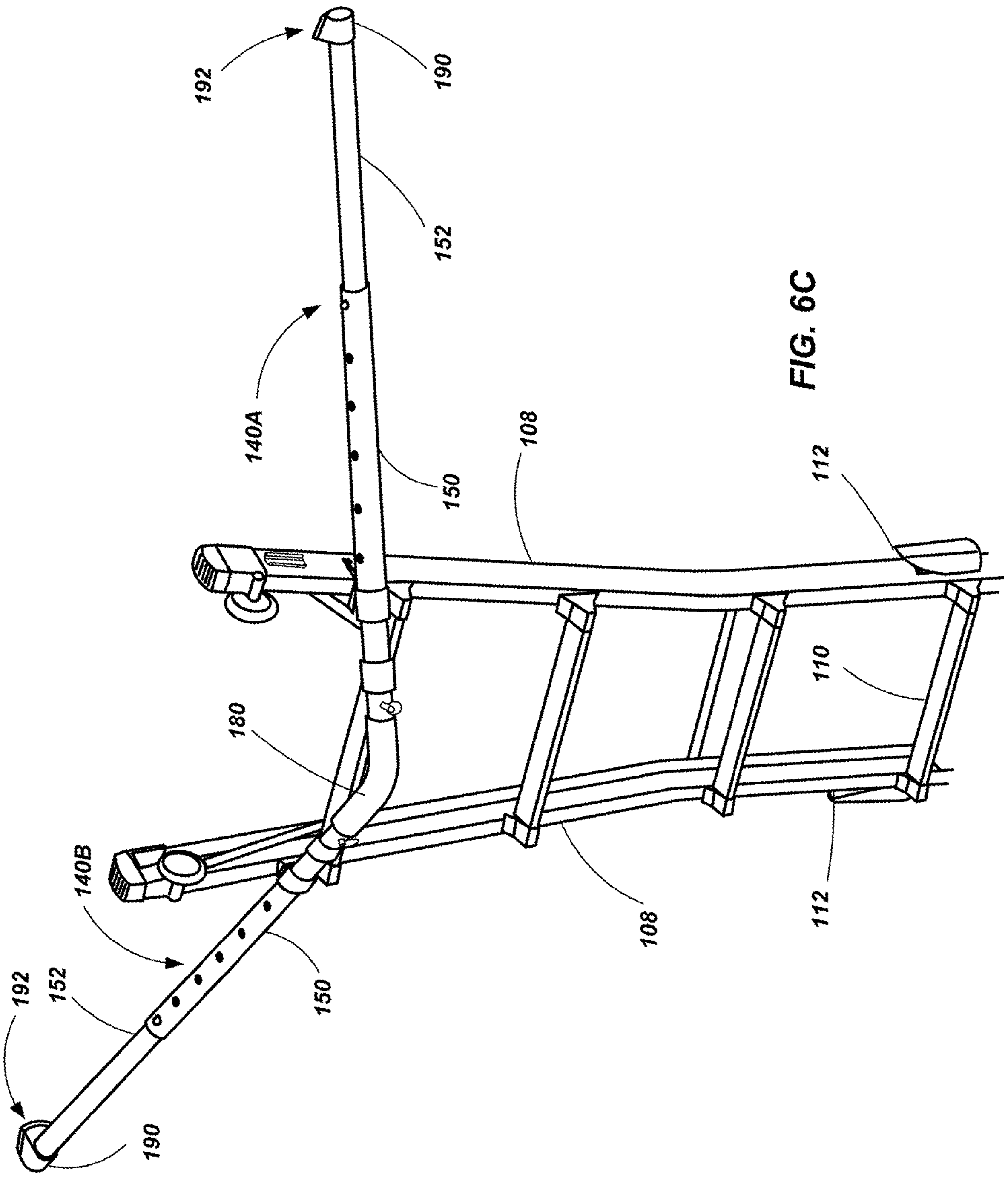

It is noted that in other embodiments, the brackets 170 to which the components 140A and 140B are coupled may be located on the back surface of the rails 108 such that the components 140A and 140B may be positioned on the back side of the ladder 100. However, coupling the stand-off device with the front side of the ladder may provide some benefits such as ease of assembly for the user while also serving as a natural barrier to prevent a user from climbing beyond a desired height on the ladder. Further, it is noted that the brackets 170 are positioned in close proximity to the top-most rung 110 (in the orientation shown in FIGS. 6A-6C), and is even positioned slightly higher than this rung. However, in other embodiments, the brackets may be positioned at other locations along the length of the rails 108, or there may be multiple brackets along the front (or back) side of the rails, enabling a user to customize the location of the stand-off device.

Figure 7:
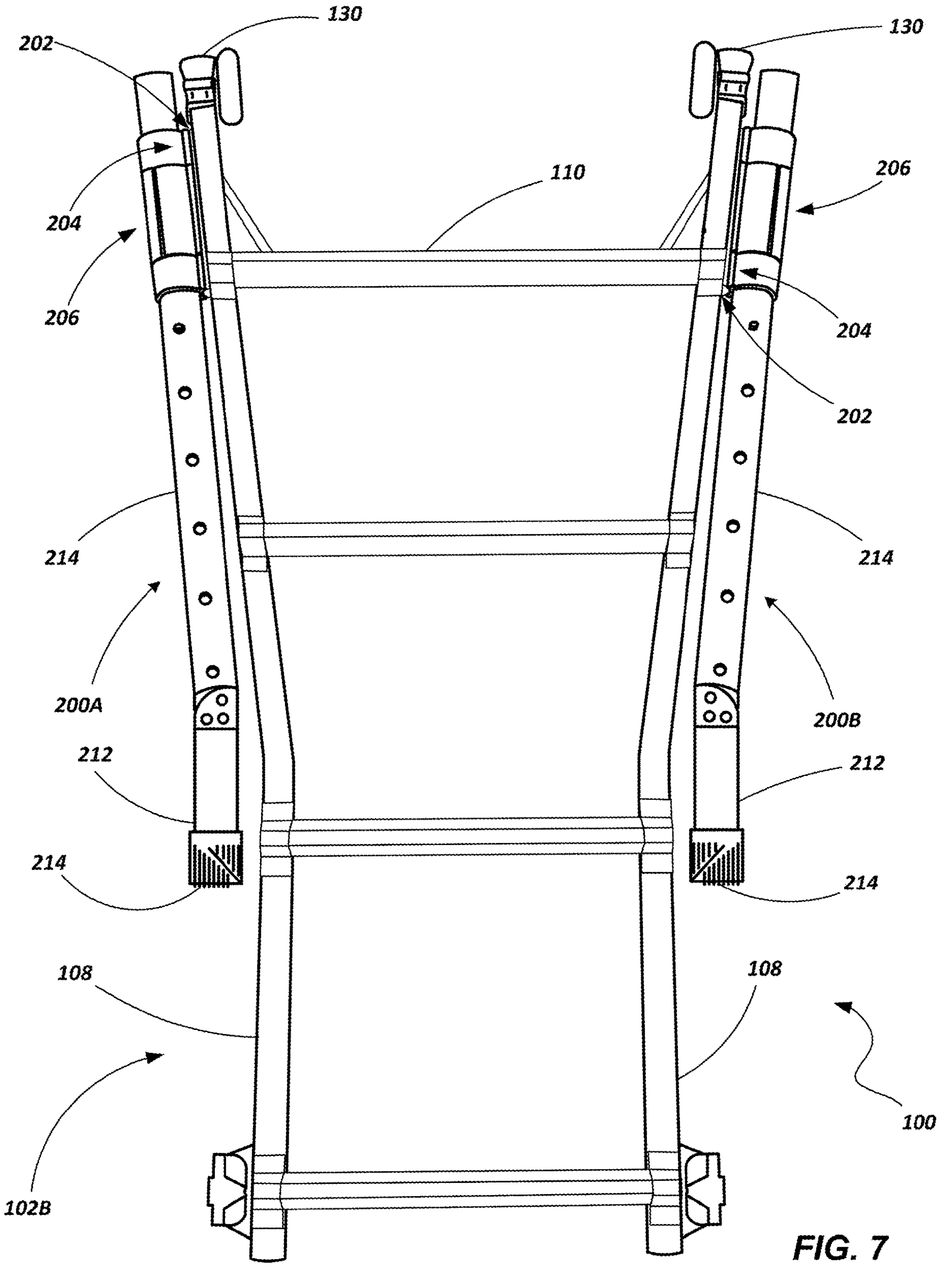
FIG. 7 is a front view of a portion of a ladder and an attached accessory according to an embodiment of the present invention.

Referring now to FIG. 7, a top portion of a ladder 100 (e.g., the outer assembly 102B of the first assembly 102) is shown with another stabilizer accessory including a first component 200A and second component 200B. As previously discussed, the stabilizer may take the form of a walkthrough device, or it may take the form of a standoff device. When not in use, individual components 200A and 200B which form the stabilizer may be coupled with rails of one of the assemblies (e.g., rails 108) in a stored state as shown in FIG. 7, keeping the components of the stabilizer in a convenient and readily accessible location while avoiding disruption of any normal uses of the ladder 100.

In one embodiment, the components 200A and 200B may be removably coupled to the rails 108 by way of brackets 202 coupled to the rails 108 and mating brackets 204 coupled with the components 200A and 200B. Each component 200A and 200B may further include a locking mechanism 206 configured to lock the component 200A or 200B to its associated rail 108 or to other components as discussed below. In some embodiments, the brackets 204 coupled with the components 200A and 200B may be integrated into, at least partially, the locking mechanism 206 such as further discussed below. When the components 200A and 200B are coupled with the rails 108 and the locking mechanism 206 is unactuated, the components 200A and 200B are locked in a stored configuration, such as shown in FIG. 7, preventing them from moving relative to their associated rails 108. However, when the locking mechanism is actuated, the components 200A and 200B may slide in a direction generally parallel to the length of the rails 108 until the brackets 202 and 204 release from one another and the components 200A and 200B are uncoupled from the rails 108. The locking mechanism 206 and its operation will be discussed in further detail below.

Figure 8:
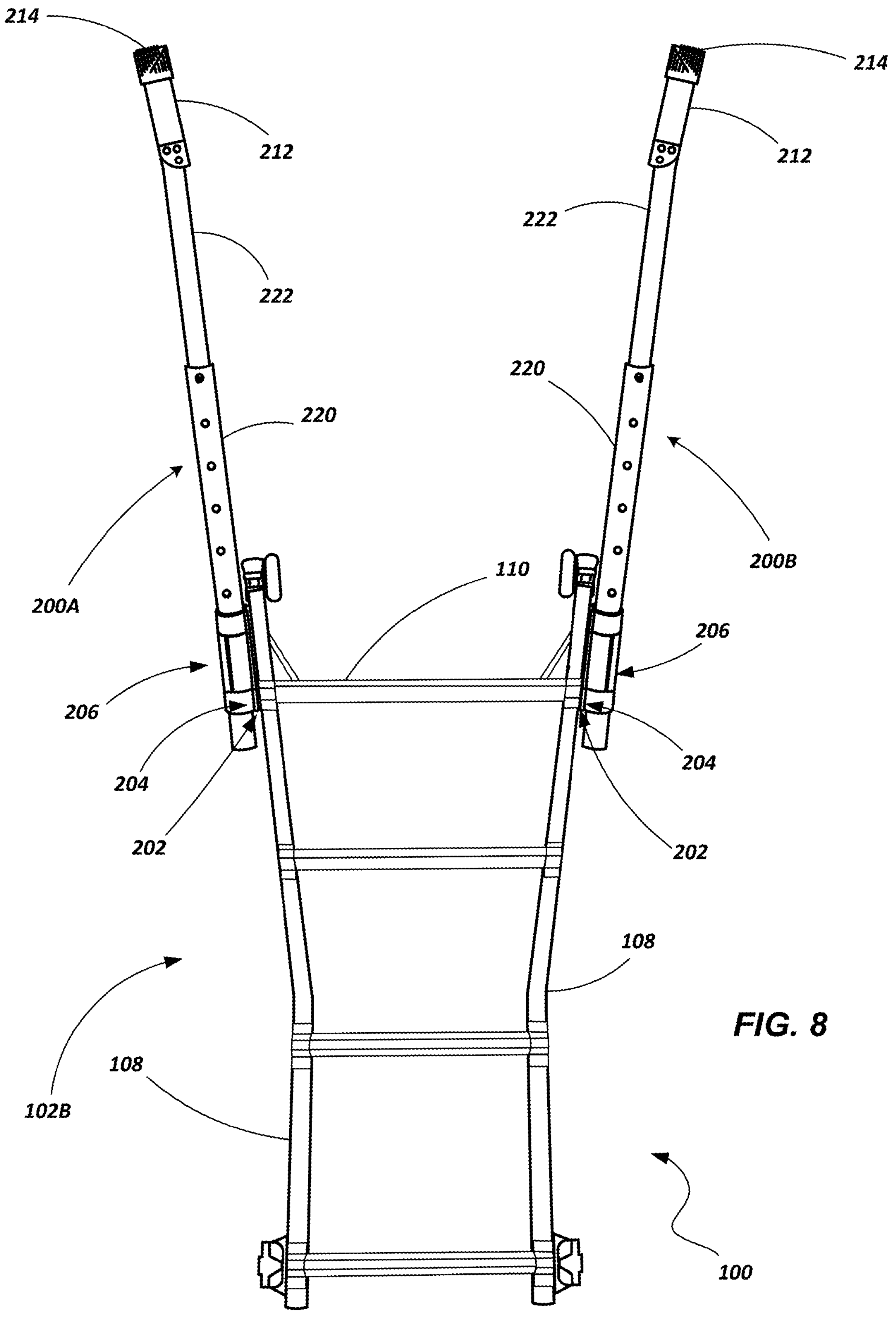
FIG. 8 is a front view of the portion of the ladder shown in FIG. 7, with the accessory placed in a different disclosure.

Referring to FIG. 8, the components 200A and 200B are shown in a walkthrough configuration wherein the components 200A and 200B are coupled with the rails 108 and extend upward beyond the feet 130 of the rails 108. The components 200A and 200B may be placed in this configuration by releasing them from their stored configuration (such as shown in FIG. 7), reversing the orientation of the components 200A and 200B relative to their rails 108, and then coupling the brackets 204 and 202 back to each other in a sliding manner until the locking mechanism 206 locks the components 200A and 200B relative to the rails 108. With the components 200A and 200B in this configuration, a user may ascend the ladder 100 and step from the upper most rung 110 onto a roof or other structure, passing between the components 200A and 200B while grasping them for purposes of stability and security. Likewise, a user can grasp the components 200A and 200B and pass between them when transitioning from the roof or other structure back onto the ladder 100.

In one embodiment, the components 200A and 200B may extend substantially parallel to their associated rails 108, or at least relative to the portions of the rails 108 to which they are attached (e.g., the flared or angled portions of the rails 108). In another embodiment, the components 200A and 200B may include a bent portion to position them closer to one another and providing a walk through space that is reduced in width. In some embodiments, when in the walkthrough configuration, the components 200A and 200B may extend in a common plane as the rails 108. In some embodiments, additional features or structures may be associated with the components 200A and 200B, including, for example, handles, slip resistant portions for grasping by a user, and the like.

Figure 9A:
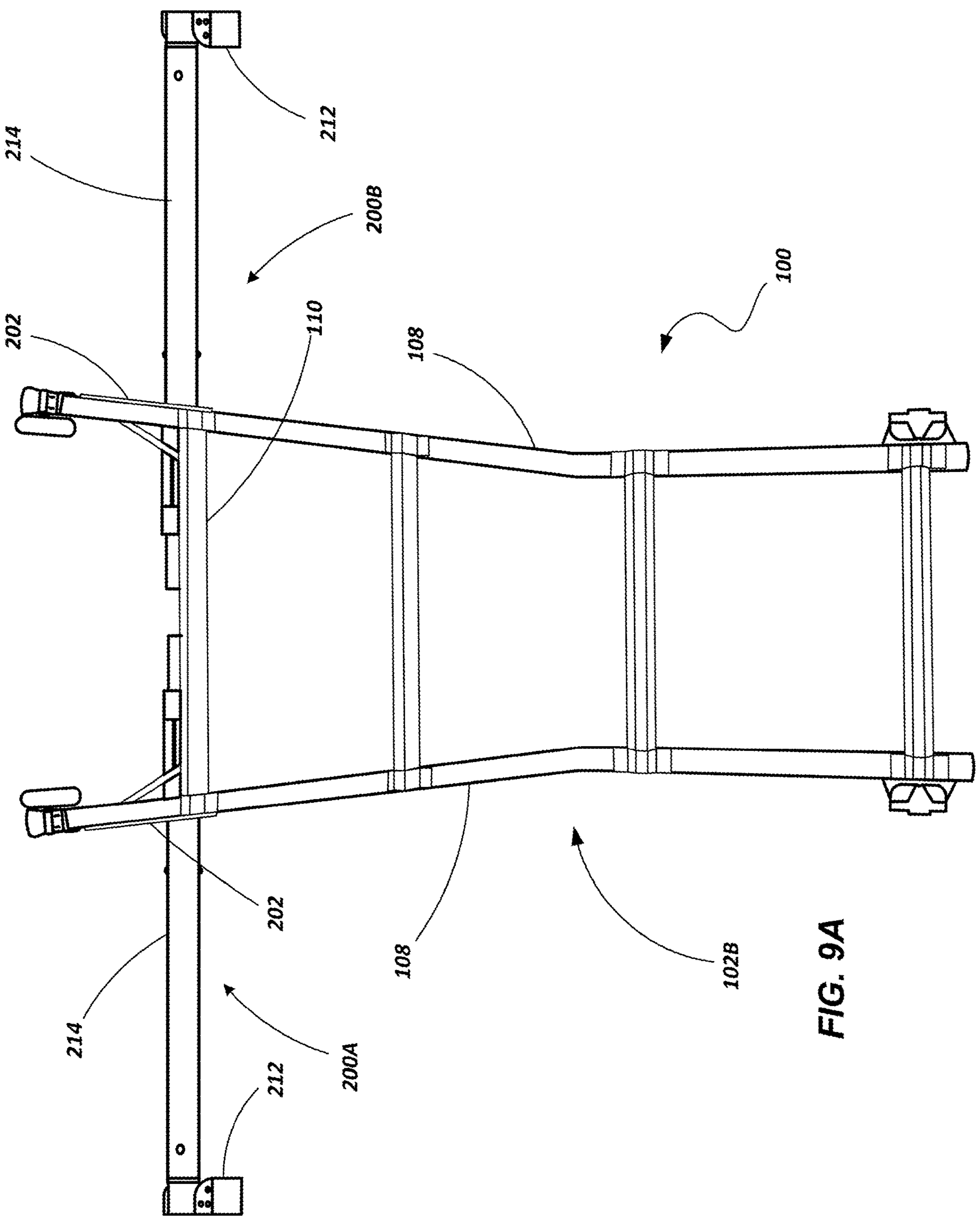
FIGS. 9A and 9B show front views of the portion of the ladder shown in FIG. 7 with the accessory placed in additional states.
Figure 9B:
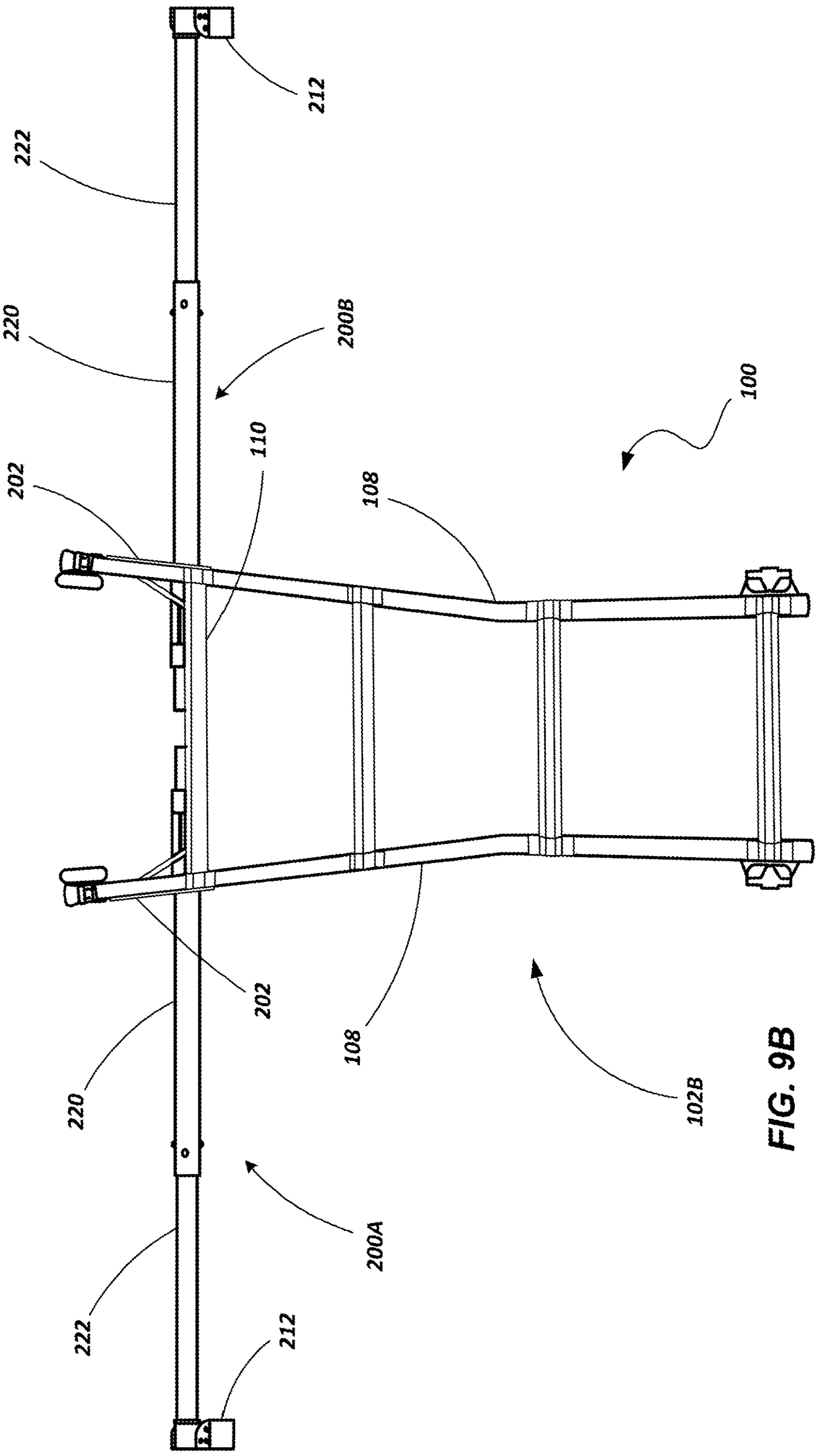
Figure 9C:
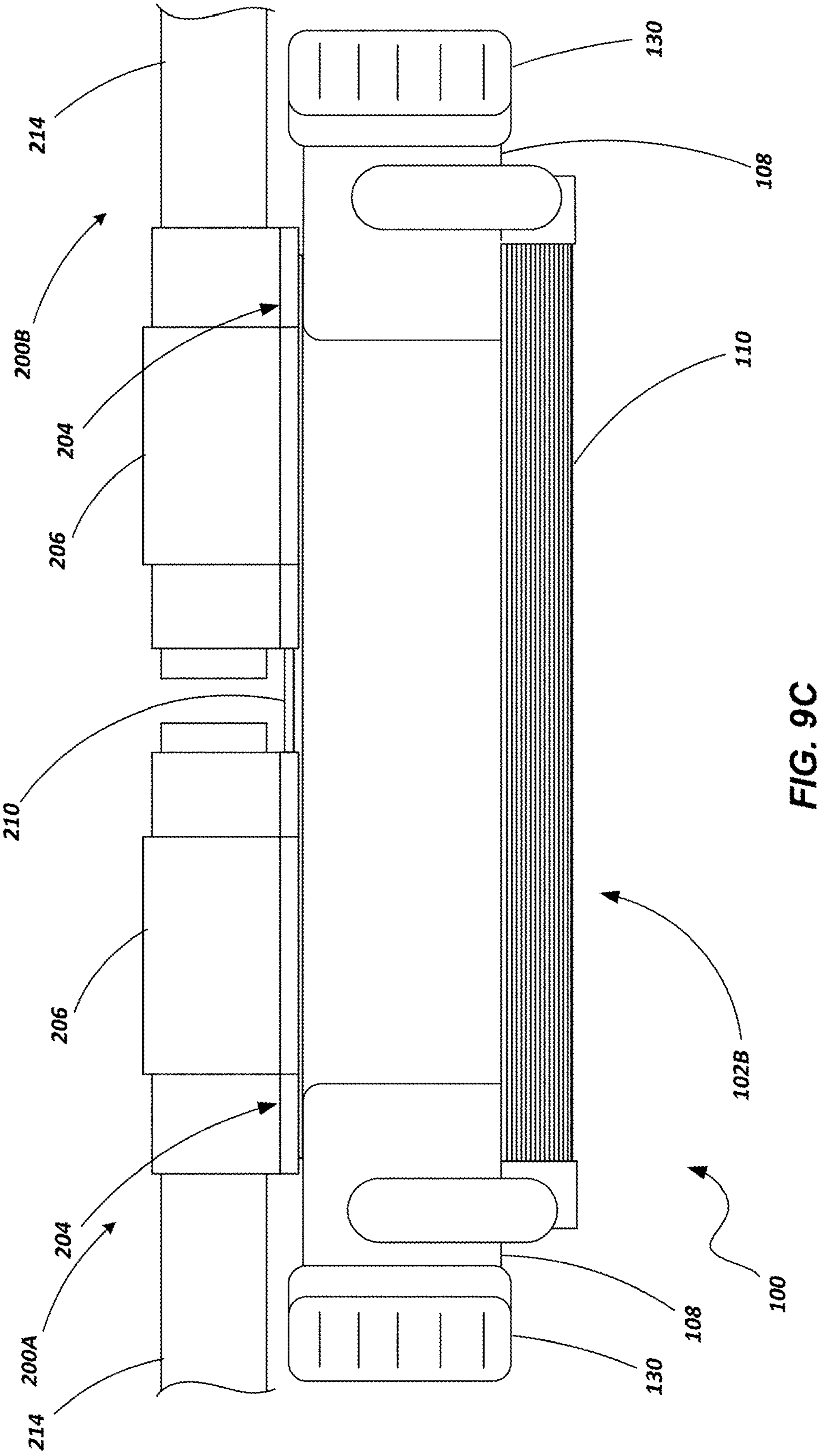
FIG. 9C is a top view of the portion of the ladder as indicated in FIG. 9A.

Referring now to FIGS. 9A-9C, an upper portion of the ladder 100 is shown with the components 200A and 200B in a stand-off configuration. When connecting in a stand-off configuration, the brackets 204 of each of the components 200A and 200B may slidingly engage, or otherwise couple with, an associated bracket 210 (which may also be referred to as a transverse bracket) that is located on a rear side of the ladder assembly 102. In some embodiments, the rear bracket 210 may be configured as a brace member, or otherwise be coupled to a brace member, extending between and coupled with the outer rails 108. In some embodiments, such as seen in FIGS. 9A and 9B, the bracket 210 may be located at a height that generally corresponds with the height of the uppermost rung.

Additionally, in this configuration, the engagement members 212 located at the laterally outer ends of the components 200A and 200B may be pivotally rotated relative to the main arms 214 (which, as discussed below, may include first and second arm members 220 and 222) of the components 200A and 200B such that an engagement surface 216 of each engagement member 212 is positioned behind or rearward of the ladder 100. Thus, when the ladder 100 is positioned against an upper supporting surface or structure (e.g., a wall, edge of a roof, etc.), the engagement members 212 contact the supporting structure while the remainder of the ladder 100 (e.g., the rails 108) remains spaced away from the supporting structure a desired distance. As with other embodiments, the engagement members 212 may include or incorporate non-marring, non-marking materials so that as they engage with an upper support structure (e.g., the siding or stucco of a wall), they are less likely to leave marks or damage the support structure in any way. Additionally, the caps 190 or other features may include slip resistant portions to help provide traction between the components 140A and 140B and the support structure, helping to keep the ladder more stable during use.

With the components 200A and 200B in the stand-off configuration, the ladder 100 may be further stabilized with wider points of contact against the upper support structure. Such a configuration may also help to avoid potential damage to portions of the support structure. For example, use of a stand-off stabilizer helps to avoid placing undue force by the ladder rails on a structure such as a rain gutter, a window or other structure.

Comparing FIG. 9A with 9B, it may be seen that the main shaft 214 of each component 200A and 200B may be telescopically extendable so that the engagement members may be placed at a variety of different widths depending, for example, on the location where the ladder is going to be deployed and the available space for the components to extend laterally outward from the rails 108 of the ladder 100. The telescopic action of the components 200A and 200B may be accomplished in the manner described hereinabove, or as discussed with respect to FIGS. 10A-11B hereinbelow.

Figures 10A, 10B:
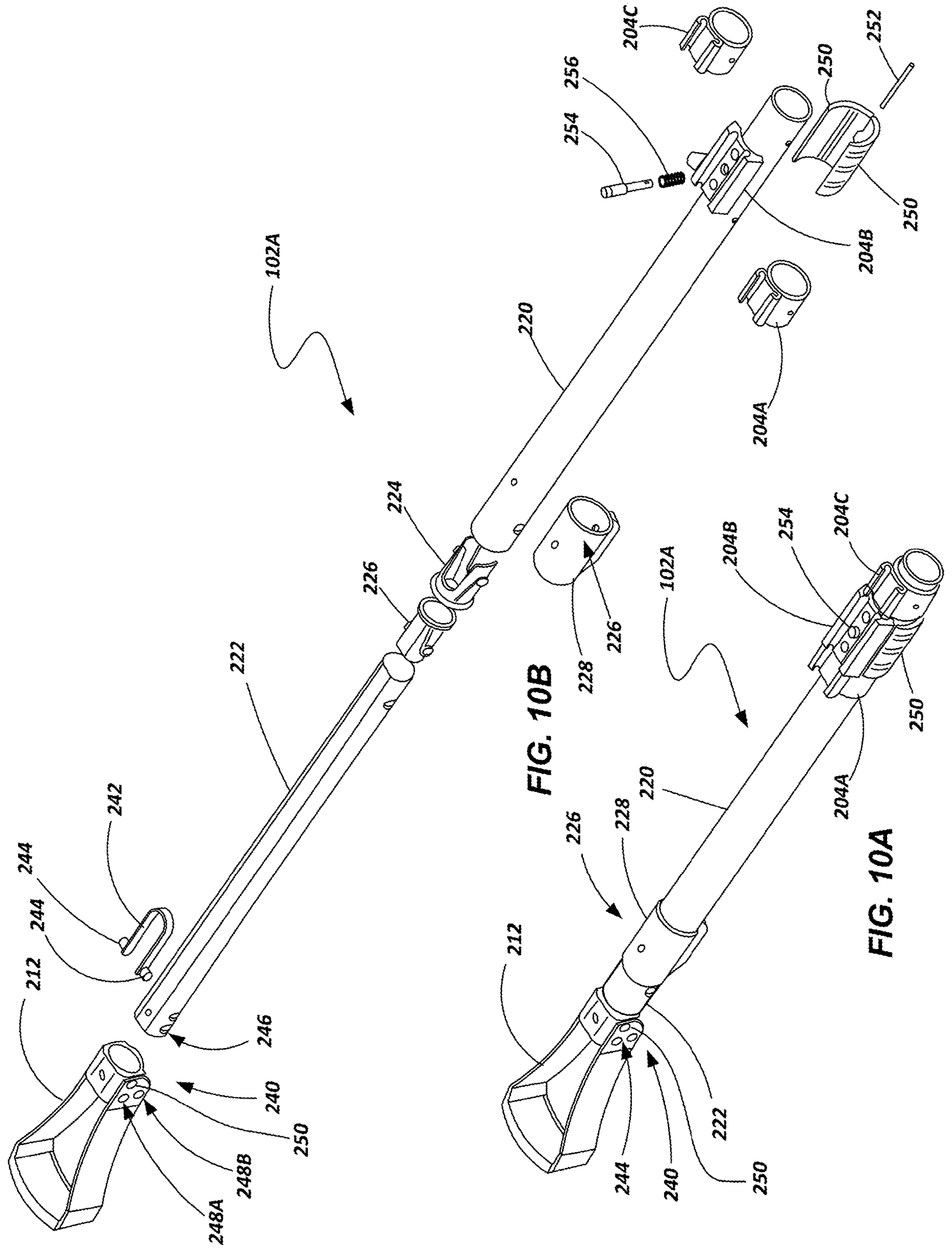
FIG. 10A is a perspective view of the accessory according to an embodiment of the present disclosure and FIG. 10B is an exploded view of the accessory shown in FIG. 10A.

Referring to FIGS. 10A and 10B, a component 200A is shown according to an embodiment of the present disclosure (FIG. 10B being an exploded view). It is noted that while the component 200A is shown in FIGS. 10A and 10B, that component 200B may be configured to be identical, or at least as a mirror image, to that which is shown and described with respect to FIGS. 10A and 10B.

The component 200A includes a pair of shafts or arm members 220 and 222 telescopingly coupled to one another (e.g., with the second arm 222 having a smaller cross-sectional area than, and slidingly fitting within and interior portion of the first arm 220). A pair of bushings or spacers 224 and 226 may be coupled between the two arm members 220 and 222 to accommodate the telescoping arrangement of the two arms 220 and 222. An arm lock assembly 226 may be coupled to one or both of the arms 220 and 222 to lock the two arms in a desired position relative to one another.

Figure 11A:
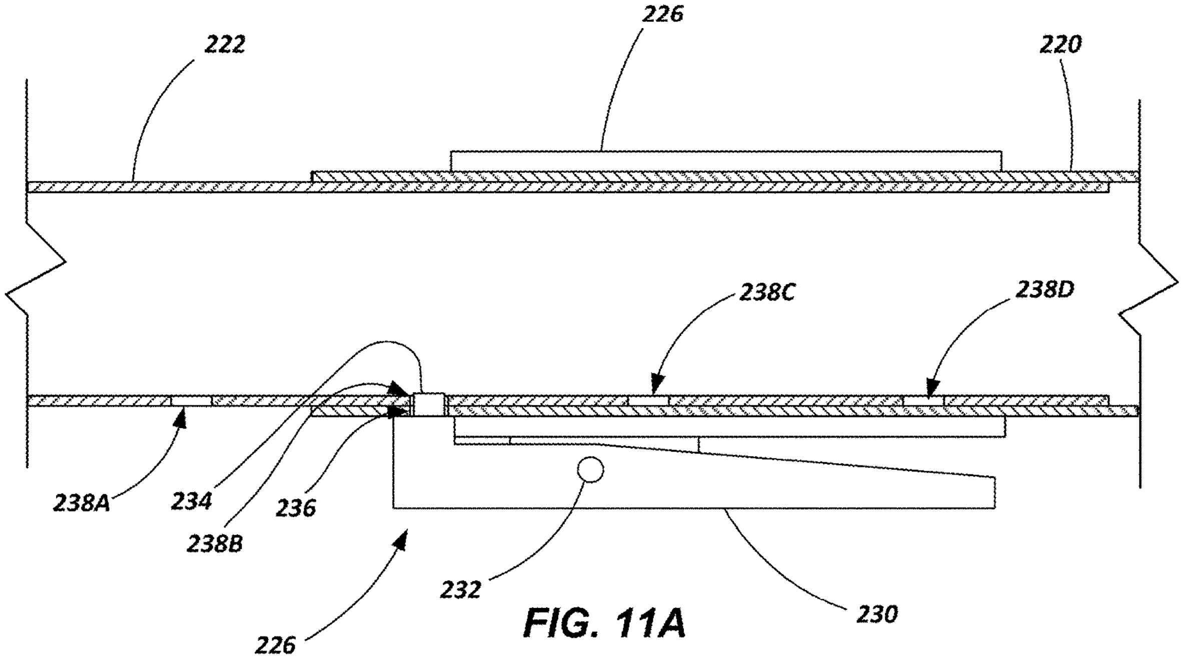
FIGS. 11A and 11B are partial cross-sectional views of a mechanism associated with the accessory shown in FIGS. 10A and 10B.
Figure 11B:
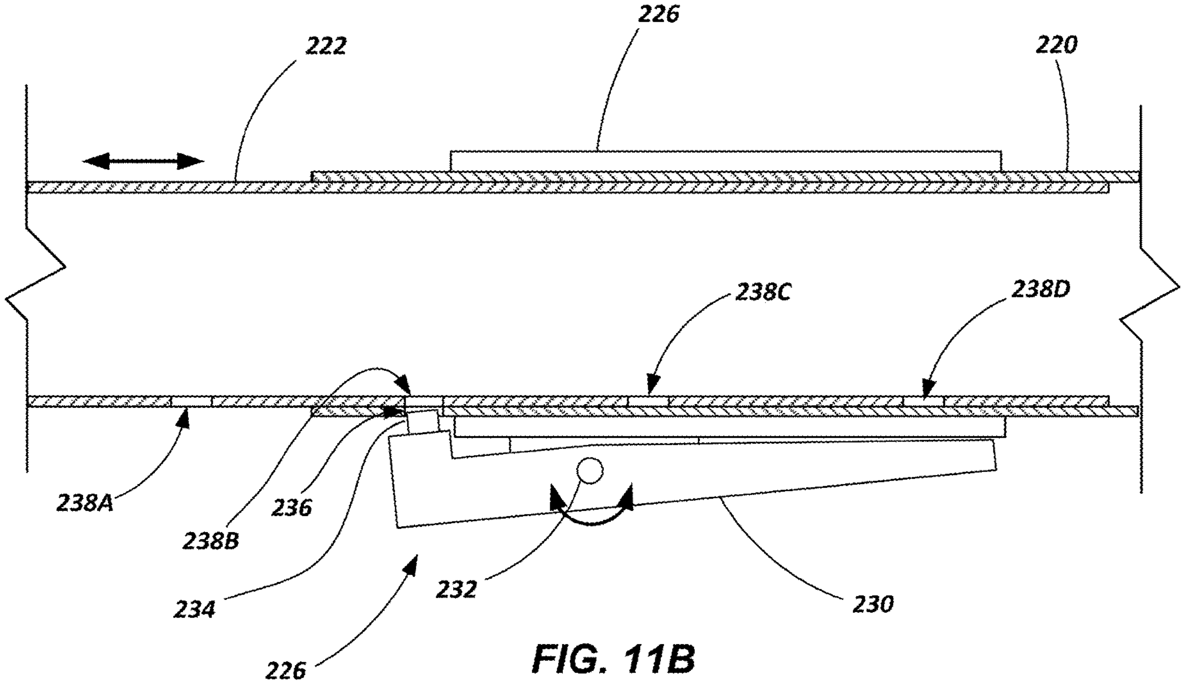

For example, as shown in FIGS. 11A and 11B the arm lock assembly 226 may include a sleeve or bracket 228 coupled with the first arm 220, and a lever 230 coupled with the bracket 228 by way of a pivot member 232. An engagement pin 234 that is coupled with the lever 230 may pass through an opening 236 formed in the first arm 220 and into one of several openings 238A-238D formed in the second arm 222 when aligned with the opening 234 of the first arm 220 as shown in FIG. 11A. When the engagement pin is positioned such that it passes through two aligned openings (e.g., 234 and 238B) as shown in FIG. 11A, the two arms are locked in their position relative to one another.

When the lever 230 is pivoted such that the engagement pin is retracted from the opening in the second arm 222 (e.g., opening 236B) as shown in FIG. 11B, the two arms 220 and 222 may slide relative to each other to change the length of the component 200A. The engagement pin 234 may engage any of the other openings (e.g., 238A, 238C or 238D) when they are aligned with the opening 236 of the first arm 220 in order to lock the two arms at a desired length. It is noted that, while FIGS. 11A and 11B show four different openings 238A-D in the second arm, such an embodiment is merely exemplary and that more or fewer openings may be provided in order to provide the arms with a desired level of adjustment. It is also noted that the lever 230 may be biases towards engagement with aligned openings such that when a user releases the lever 230, the engagement members contacts a surface of the second arm until an opening 238A-D of the second arm 222 becomes aligned with the opening 236 of the first arm, whereupon the lever rotates into engagement with the aligned opening 238A-D of the second arm due to the biasing force applied thereto. Such a biasing force may be provided, for example, by an appropriate spring member positioned between the lever 230 and the bracket 228.

Referring back to FIGS. 10A and 10B, as previously discussed, the component 200A further includes an engagement member 212 that may be pivoted between multiple positions, including a first position where the engagement member extends 212 longitudinally from the second arm 222 (e.g., generally aligned with the length or longitudinal axis of the second arm 214), and at least a second position where the engagement member 212 extends at an angle (e.g., an obtuse angle, a right angle, or an acute angle) relative to the length of the second arm 222. A locking mechanism 240 may be used to selectively lock the engagement member 212 at a given position relative to the second arm 222. In one embodiment, the locking mechanism 240 may include a U-shaped spring 242 or other biasing member that biases a pair of buttons 244 away from one another along a common axis. The buttons may extend through apertures or openings 246 in the second arm 222 and into apertures or openings 248A and 248B when they are aligned with the openings 246 of the second arm 222. The engagement member 212 may be pivotally coupled to the second arm 222 via a pivot member 250 (e.g., a pin, shaft, or fastener), enabling it to pivot between its various positions relative to the second arm 222.

As previously noted, the component 200A may also include a bracket 202 for coupling the component 200A with the ladder 100. In one embodiment, the bracket 204 may include multiple bracket members 204A-204C aligned along a length of the first arm 220. In one embodiment, one of the bracket members (e.g., 204B) may also function as a cover for the locking mechanism 206, being positioned over actuator members 250 (also referred to as squeeze handles) of the locking mechanism 206. The bracket 202 may be configured with grooves or slots that are sized and configured to receive correspondingly shaped and sized portions of mating brackets (e.g., brackets 202 or 210) such as previously discussed.

In one embodiment, the locking mechanism 206 may be configured as a squeeze mechanism having a pair of actuator members 250, hingedly coupled via a spring pin or hinge pin 252. The locking mechanism 206 may further include an engagement pin or a lock pin 254 coupled with the spring pin 252, and a biasing member such as a coiled spring 256, configured to bias the lock pin 254 radially outward through an opening 258 formed in the first arm 220 (and a corresponding opening formed in any bracket component—e.g., bracket component 204B— positioned adjacent the opening 258).

Figure 12A:
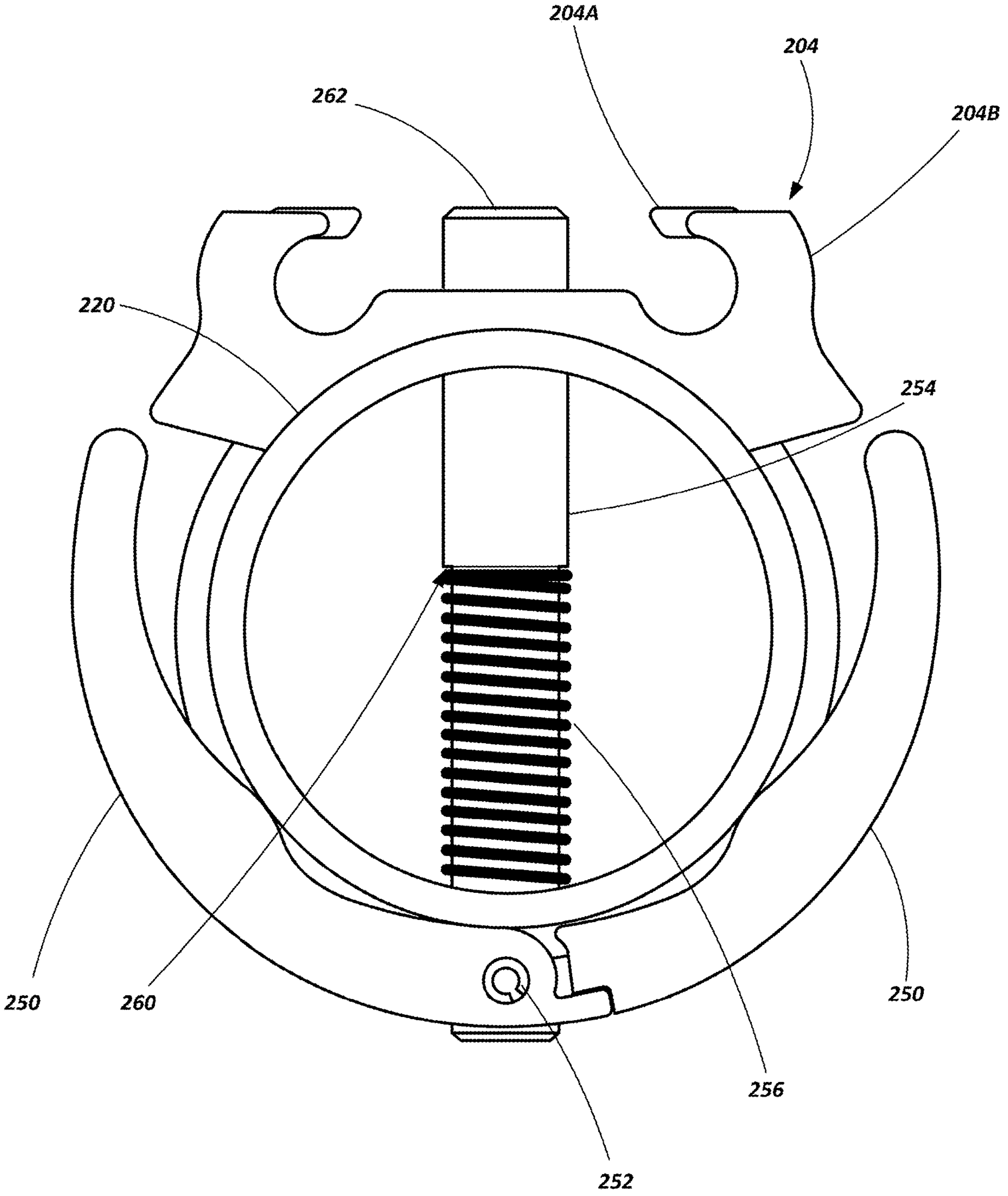
FIGS. 12A and 12B are end views of another mechanism associated with the accessory shown in FIGS. 10A and 10B.
Figure 12B:
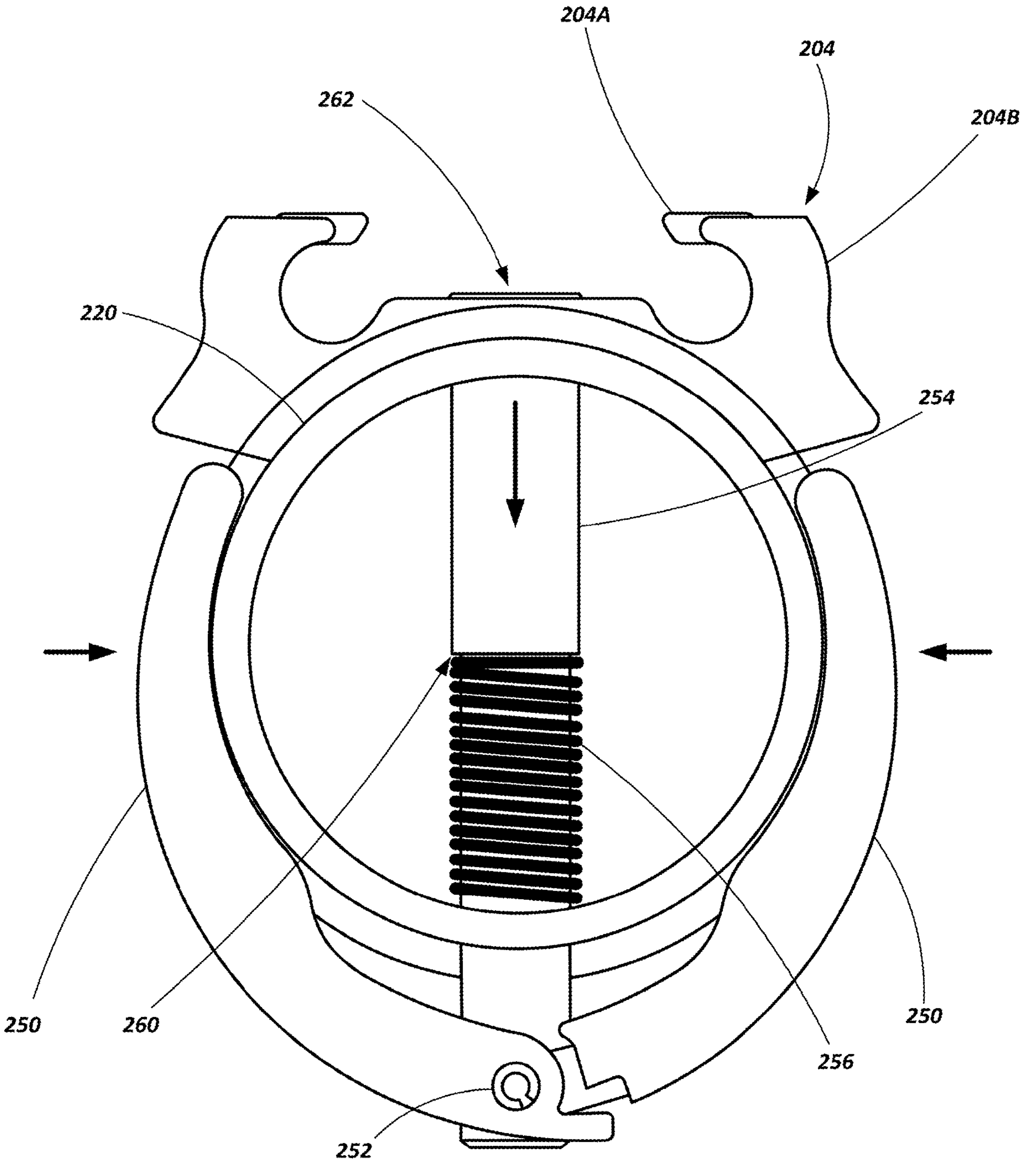

As seen in FIGS. 12A and 12B, the lock pin 254 may extend through opposite sides of the first arm 220 and be pivotally or hingedly coupled with the actuator members 250 by way of the spring pin 252. The spring 256 may be positioned about a portion of the lock pin 254 and configured to abut a shoulder portion 260 of the engagement pin at one end, and an internal surface of the first arm 220 at the other end. As seen in FIG. 12A, when in an unactuated state, the spring 256 biases the lock pin 254 upwards so that the free end 262 extends through the wall of the first arm 220, beyond a surface of the bracket member 204B, and into an opening of a corresponding bracket member (e.g., bracket 202 or 210) as indicated by dashed lines in FIGS. 12A and 12B. Engagement of the lock pin 254 with an opening of an associated bracket (e.g., 202 or 210) locks the component 200 in a desired position.

As seen in FIG. 12B, when the actuator members 250 are squeezed towards each other, the displacement of the actuator members 250 results in displacement of the lock pin 254 to retract the free end 262 a distance sufficient to disengage any opening in a mating bracket (e.g., 202 or 214), enabling mating brackets (e.g., 202 and 204) to slide relative to each other for removal of the member 200A from the ladder 100. When the actuator members 250 are released, the spring 256 biases the lock pin 254 upwards, returning the lock pin 254 and actuator members 250 back to their unactuated positions as shown in FIG. 12A. Attaching a member 200A to a rail 108, rear bracket 210, or other member of the ladder 100, may be accomplished similarly by squeezing the actuator members 250 of the locking mechanism 206, slidingly engaging the bracket 204 of the member 200A with a mating bracket (e.g., 202 or 210), and releasing the actuating member such that the lock pin 254 extends into a mating, aligned hole associated with the bracket member (202 or 210) or associated structure (e.g., rail 108, brace member or the like).

While the invention may be susceptible to various modifications and alternative forms, specific embodiments have been shown by way of example in the drawings and have been described in detail herein. However, it should be understood that the invention is not intended to be limited to the particular forms disclosed. Additionally, features, components and aspects of one embodiment may be combined with features, components and aspects of any other embodiment without limitation. The disclosure is considered to include all modifications, equivalents, and alternatives falling within the spirit and scope of the invention as defined by the following appended claims.

What is claimed is:

1. A ladder, comprising:

a pair of rails including a first rail and a second rail, the first rail having a first rear surface, the second rail having a second rear surface;

a plurality of rungs coupled to and extending across the pair of rails;

at least one bracket directly attached to and extending between the first rear surface and the second rear surface, wherein when the pair of rails is supported by a vertical support surface, the at least one bracket is configured to be positioned between the first and second rear surfaces and the vertical support surface; and a pair of components, each having an arm member and a mating bracket positioned at an end of the arm member, the mating bracket being slidably attachable to a rear side of the at least one bracket in a standoff configuration;

wherein, when in the standoff configuration, the pair of components is positionable against a support structure at points of contact wider than the first rail and the second rail, and the pair of components is positioned rearwardly offset from the at least one bracket.

2. The ladder of claim 1, further comprising at least one lock assembly configured to attach at least one component of the pair of components to the at least one bracket.

3. The ladder of claim 1, wherein:

the arm member of each component of the pair of components is a first arm member; and each component of the pair of components further comprises a second arm member telescopingly coupled to the first arm member, and an arm lock assembly, the arm lock assembly being configured to maintain a position of the first arm member relative to the second arm member.

4. The ladder of claim 3, wherein the arm lock assembly comprises a sleeve coupled with the first arm member.

5. The ladder of claim 4, wherein the arm lock assembly comprises a lever pivotally coupled with the sleeve.

6. The ladder of claim 5, wherein the arm lock assembly comprises an engagement pin coupled with the lever, the engagement pin being insertable into at least one opening defined in the second arm member.

7. The ladder of claim 6, wherein when the engagement pin is inserted into the at least one opening, the first arm member is positionally locked relative to the second arm member.

8. The ladder of claim 6, wherein when the engagement pin is retracted from the at least one opening, the first arm member is slidably adjustable relative to the second arm member.

9. A ladder, comprising:

a pair of rails defining an overall width, each rail of the pair of rails having a rear surface;

a plurality of rungs coupled to the pair of rails;

a first component and a second component, each including a first arm, a second arm, a component bracket, and a lock assembly, the lock assembly being configured to positionally lock the first arm relative to the second arm;

a bracket directly attached to and positioned on the rear surface of at least one rail of the pair of rails, wherein the component bracket of the first component and the component bracket of the second component are simultaneously slidably engageable with the bracket;

wherein the first component and the second component are coupleable to the bracket in a plurality of stand-off configurations corresponding to a plurality of locked positions of the first arms relative to the second arms, wherein the first component and the second component extend laterally outward from the pair of rails wider than the overall width in each position of the plurality of locked positions.

10. The ladder of claim 9, wherein the component bracket comprises a slot sized and shaped to engage corresponding portions of the bracket.

11. The ladder of claim 9, further comprising actuator members to releasably couple the component bracket and the bracket.

12. The ladder of claim 11, wherein the actuator members include squeeze handles to release the component bracket and the bracket.

13. The ladder of claim 9, wherein the bracket is directly coupled with each rail of the pair of rails.

14. The ladder of claim 9, wherein the bracket is positioned at a height of an uppermost rung of the plurality of rungs.

15. A ladder comprising:

a pair of spaced apart outer rails, each having a front surface and a rear surface;

a plurality of outer rungs coupled to the front surfaces of the pair of spaced apart outer rails and extending between the pair of spaced apart outer rails, wherein the rear surfaces of the pair of spaced apart outer rails are configured to face away from a user climbing the plurality of outer rungs;

a pair of spaced apart inner rails slidably coupled with the pair of spaced apart outer rails;

a plurality of inner rungs coupled to and extending between the pair of spaced apart inner rails;

a transverse bracket directly attached to and extending between both of the rear surfaces of the pair of spaced apart outer rails;

a pair of stabilizers, each stabilizer of the pair of stabilizers being simultaneously slidably attachable to the transverse bracket in a stand-off configuration extending laterally outward beyond the pair of spaced apart outer rails, wherein the pair of stabilizers comprises a bracket defining a slot configured to receive at least a portion of the transverse bracket.

16. The ladder of claim 15, wherein the pair of stabilizers each comprise a pair of telescopingly coupled arms.

17. The ladder of claim 15, wherein each stabilizer of the pair of stabilizers includes a component bracket engageable with the transverse bracket.

* * * * *